United States Patent
Nakagawa et al.

(10) Patent No.: US 10,033,906 B2
(45) Date of Patent: Jul. 24, 2018

(54) IMAGE PROCESSING APPARATUS WITH IMPROVED QUANTIZATION, IMAGE PROCESSING METHOD AND STORAGE MEDIUM THEREOF

(71) Applicant: CANON KABUSHIKI KAISHA, Tokyo (JP)

(72) Inventors: Junichi Nakagawa, Tokyo (JP); Akitoshi Yamada, Yokohama (JP); Masao Kato, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/014,935

(22) Filed: Feb. 3, 2016

(65) Prior Publication Data

US 2016/0241740 A1    Aug. 18, 2016

(30) Foreign Application Priority Data

Feb. 12, 2015    (JP) ................................ 2015-025477

(51) Int. Cl.
*H04N 1/40*    (2006.01)

(52) U.S. Cl.
CPC .............................. *H04N 1/40087* (2013.01)

(58) Field of Classification Search
None
See application file for complete search history.

(56) References Cited

U.S. PATENT DOCUMENTS

| 6,738,160 | B1 | 5/2004 | Kato |
| 6,867,884 | B1* | 3/2005 | Rozzi ....................... H04N 1/52 358/1.9 |
| 7,099,046 | B2 | 8/2006 | Yamada |
| 7,312,901 | B2 | 12/2007 | Yamada |
| 7,548,346 | B2 | 6/2009 | Yamada |

(Continued)

FOREIGN PATENT DOCUMENTS

JP    4059701    12/2007

OTHER PUBLICATIONS

U.S. Appl. No. 14/971,271, filed Dec. 16, 2015.

(Continued)

*Primary Examiner* — Lennin Rodriguezgonzalez
(74) *Attorney, Agent, or Firm* — Fitzpatrick, Cella, Harper & Scinto

(57) ABSTRACT

An image processing apparatus converts multi-valued data into multi-valued quantized data having fewer levels than the multi-valued data. The apparatus includes an acquisition unit that acquires threshold values, a provisional quantization unit that sets a provisional quantized value with respect to the multi-valued data, and a quantization unit that decides a quantized value with respect to the multi-valued data based on a result of comparing comparative multi-valued data for the multi-valued data to the threshold value. The quantization unit decides the quantized value so that in a case where the multi-valued data is the same intermediate value, pixels having the value larger than provisional quantized value increase, pixels having the provisional quantized value do not change in number, and pixels having the value smaller than the provisional quantized value decrease in a designated pixel area as the value of the multi-valued data rises.

31 Claims, 12 Drawing Sheets

(56) References Cited

U.S. PATENT DOCUMENTS

| | | |
|---|---|---|
| 7,672,011 B2 | 3/2010 | Kato |
| 7,855,809 B2 | 12/2010 | Kato |
| 7,859,723 B2 | 12/2010 | Yamada |
| 7,965,418 B2 | 6/2011 | Yamada |
| 8,503,031 B2 | 8/2013 | Kajihara |
| 8,619,319 B2 | 12/2013 | Tsuchiya |
| 8,830,530 B2 | 9/2014 | Sano |
| 9,087,291 B2 | 7/2015 | Hori |
| 9,092,720 B2 | 7/2015 | Nakagawa |
| 9,210,292 B2 | 12/2015 | Miyake |
| 2011/0085189 A1* | 4/2011 | Sano .................... G06K 15/107 358/1.9 |
| 2011/0116115 A1 | 5/2011 | Kawatoko |
| 2014/0139885 A1* | 5/2014 | Nakagawa ........... H04N 1/4051 358/3.14 |

OTHER PUBLICATIONS

U.S. Appl. No. 14/971,287, filed Dec. 16, 2015.
U.S. Appl. No. 14/971,277, filed Dec. 16, 2015.
U.S. Appl. No. 14/991,618, filed Jan. 8, 2016.
U.S. Appl. No. 15/040,449, filed Feb. 10, 2016.
Robert Ulichney, "Digital Halftoning", Chapter 8 (Dithering with Blue Noise), pp. 233-239, The MIT Press, Cambridge, Massachusetts, London, England, originally published Jan. 1, 1987.
Robert Ulichney, "The void-and-cluster method for dither array generation", Proceedings, SPIE, Human Vision, Visual Processing, Digital Displays IV, vol. 1913, pp. 332-343, 1993.

\* cited by examiner

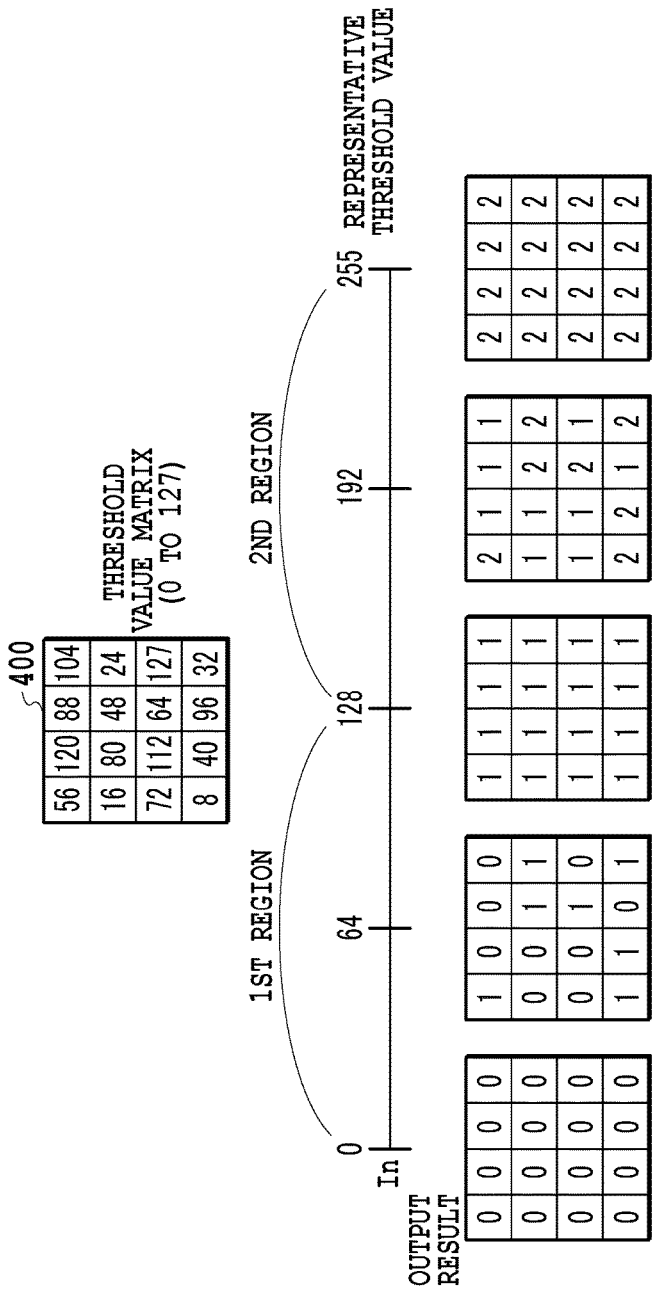
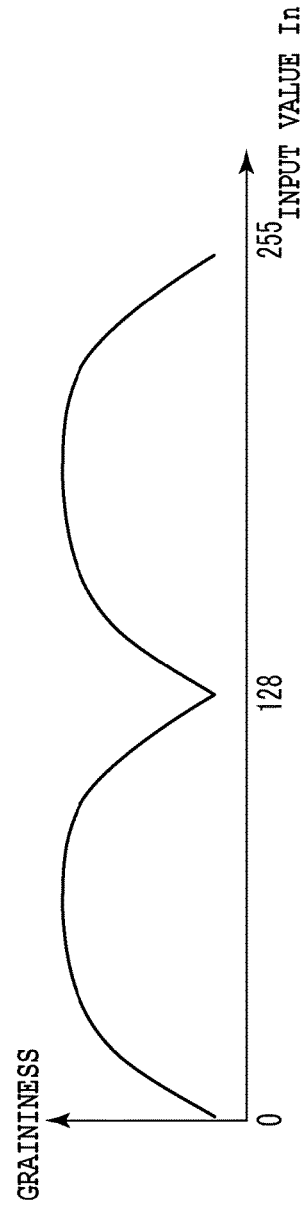
FIG.4A
FIG.4B

IMAGE PROCESSING APPARATUS WITH IMPROVED QUANTIZATION, IMAGE PROCESSING METHOD AND STORAGE MEDIUM THEREOF

BACKGROUND OF THE INVENTION

Field of the Invention

The present invention relates to an image processing apparatus, image processing method, and storage medium for performing a quantization process to form an image on a print medium.

Description of the Related Art

In the case of using a pseudo gradation method to print an image, it is necessary to quantize multi-valued image data, and as a quantization method used for the quantization, an error diffusion method and a dither method are known. In particular, the dither method that compares a preliminarily stored threshold value and a gradation value of multi-valued data with each other to determine dot printing or non-printing has a small processing load as compared with the error diffusion method, and is therefore widely used in many image processing apparatuses. In the case of such a dither method, in particular, dot dispersibility in a low gradation range becomes problematic; however, as a threshold value matrix for obtaining preferable dot dispersibility, a threshold value matrix having blue noise characteristics is proposed.

FIGS. 5A and 5B are diagrams illustrating blue noise characteristics and the human visual transfer function (VTF) at a visibility distance of 250 mm. In both drawings, the horizontal axis represents frequency (cycles/mm), with the frequency going lower proceeding to the left side of the graph, and the frequency going higher proceeding to the right side. Meanwhile, the vertical axis represents the power corresponding to each frequency.

Referring to FIG. 5A, blue noise characteristics feature a depressed low-frequency component, a sudden peak, and a flat high-frequency component. On the other hand, the human VTF illustrated in FIG. 5B is highly sensitive in the low-frequency region, and less sensitive in the high-frequency region. In other words, a low-frequency component is easy to notice, whereas a high-frequency component is difficult to notice. In light of such a visual transfer function, blue noise characteristics are made to have almost no power in the low-frequency region where the sensitivity of the visual transfer function is high (easy to notice), and have power in the high-frequency region where the sensitivity of the visual transfer function is low (difficult to notice). For this reason, when a person views an image obtained by performing a quantization process using a threshold value matrix having blue noise characteristics, dot imbalances and periodicities are hardly noticed, and the image is perceived as pleasant.

Blue noise characteristics as described above are defined and explained in much of the literature, such as Robert Ulichney, "Digital Halftoning", The MIT Press Cambridge, Mass. (London, England). In addition, regarding the method of creating a threshold value matrix while controlling the frequency components, including the blue noise characteristics, the void-and-cluster method may be adopted. A method of creating a threshold value matrix using the void-and-cluster method is disclosed in Robert Ulichney, "The void-and-cluster method for dither array generation", Proceedings SPIE, Human Vision, Visual Processing, Digital Displays IV, vol. 1913, pp. 332-343, 1993.

Meanwhile, among recent inkjet printing apparatuses, higher gradations and higher resolutions are being pursued, and apparatuses capable of printing dots at a high resolution such as 1200 dots per inch (dpi) or 2400 dpi are being provided. However, in the case of attempting to perform all of the signal value conversion for generating data printable by the printing apparatus from image data in a designated format at a high resolution of 1200 dpi or 2400 dpi, the large processing load and drop in throughput are causes for concern. For this reason, in many inkjet printing apparatuses, a method is adopted in which the primary image processing is performed at a comparatively low resolution of approximately 600 dpi, and after subsequently performing multi-valued quantization of respective image data to multiple levels, a binarization process matched to the printing resolution is additionally performed.

FIGS. 4A and 4B are diagrams illustrating specific examples of multi-valued quantization using a threshold value matrix. FIG. 4A illustrates the case of quantizing multi-valued input data In from 0 to 255 into three values from Level 0 to Level 2 using a threshold value matrix 400. In the threshold value matrix 400, threshold values from 0 to 127 are mapped to individual pixel areas with high dispersibility. The drawing illustrates the area of the threshold value matrix 400 as a 4-pixel by 4-pixel area for the sake of simplicity, but in actual practice, the threshold value matrix includes areas in which at least one or more of each of the threshold values from 0 to 127 are mapped.

When performing multi-valued quantization of multi-valued input data In with 256 values into 3 values, the region (0 to 255) of the multi-valued input data is divided into a first region (0 to 128) and a second region (129 to 255), and a binarization process is performed using a designated threshold value matrix for each of the regions. Subsequently, for the first region, the multi-valued input data In is quantized to Level 1 when greater than the corresponding threshold value, and quantized to Level 0 when less than or equal to the threshold value. For the second region, the multi-valued input data In is quantized to Level 2 when greater than the corresponding threshold value, and quantized to Level 1 when less than or equal to the threshold value. In this way, in a typical multi-valued quantization process, the region of the multi-valued input data In is divided into the number L of quantized levels minus 1 (L−1), and a binarization process is performed on each of the regions to obtain quantized values with L levels.

FIG. 4A specifically illustrates the quantization results for several pieces of multi-valued input data In. When In=0, the quantized value of all pixels becomes 0. When In=128, the quantized value of all pixels becomes 1. When In=255, the quantized value of all pixels becomes 2. Also, when 0<In<128, the quantized values are a mixture of the two levels 0 and 1. When 128<In<255, the quantized values are a mixture of the two levels 1 and 2.

FIG. 4B illustrates the degree of perceived graininess in the case of actually printing a dot pattern on a print medium according to the multi-valued input data In. As the graininess becomes higher, roughness in the image becomes more noticeable, leading to an unfavorable visual impression. When the multi-valued input data In is 0, or 128, or 255, the pixel areas are uniform, having the same quantized values. As a result, the same dot pattern is uniformly arranged over the entire image area, and graininess is kept to a minimum. Conversely, when the multi-valued input data In is 0<In<128, or 128<In<255, the two types of quantized values are mixed in the pixel areas. As a result, different dot patterns are interspersed over the entire image area, and graininess is increased. In particular, the graininess becomes the highest when In=64, at which there is an even mixture of the quantized values 0 and 1, and when In=192, at which there is an even mixture of the quantized values 1 and 2.

In such a situation, if the multi-valued input data In gradually changes from 0 to 255, the graininess changes most suddenly near In=128. Additionally, when a gradation pattern is printed such a change of graininess is perceived as a pseudo contour. In other words, with the typical multi-valued quantization process using the dither method of the related art, a continuity of density is obtained, but a continuity of graininess is not obtained.

Such discontinuity of graininess is caused by the existence of gradations for which all pixel areas of the threshold value matrix are uniformly set to a single quantized value (for example, In=128 results in a uniform quantized value of 1). For gradations uniformly set to a single quantized value in this way, identical dot patterns are repeatedly arranged, thereby causing the graininess to become extremely low compared to the neighboring gradations.

In light of such a phenomenon, Japanese Patent No. 4059701 discloses a multi-valued quantization method configured to not produce gradations uniformly set to a single quantized value. Specifically, for specific gradations near In=128, the multi-valued quantization method generates pixels whose quantized value becomes 2 even if In<128 and pixels whose quantized value becomes 0 even if In>128, resulting in a mixture of quantized values at the three levels 0, 1, and 2 within the threshold value matrix area. Additionally, the graininess at In=128 is kept from becoming extremely low to moderate the discontinuity of graininess.

However, adopting the method in Japanese Patent No. 4059701 by using a threshold value matrix having blue noise characteristics produces a situation in which the advantageous effects of blue noise characteristics cannot be sufficiently exhibited. Hereinafter, a specific description will be given.

In a threshold value matrix having blue noise characteristics, by mapping dots to pixels corresponding to continuous threshold values including the minimum threshold value (0), blue noise characteristics with high dispersibility may be obtained. Consequently, even if dots are mapped to pixels corresponding to continuous threshold values, sufficient blue noise characteristics cannot be obtained when pixels corresponding to the minimum value or a nearby threshold value (0) are not included.

FIGS. 6A to 6C are diagrams illustrating the frequency characteristics in the case of mapping dots to a specific threshold value region in a threshold value matrix having blue noise characteristics. Similar to FIGS. 5A and 5B, the horizontal axis represents spatial frequency (cycles/mm), while the vertical axis represents power. Herein, a threshold value matrix in which threshold values from 1 to 127 are arranged two at a highly dispersed state in a 16×16 pixel area is used. FIG. 6A illustrates the frequency characteristics in the case of mapping dots to the threshold values from 0 to 29, while FIG. 6B illustrates the frequency characteristics in the case of mapping dots to the threshold values from 30 to 97, and FIG. 6C illustrates the frequency characteristics in the case of mapping dots to the threshold values from 98 to 127.

In FIG. 6A, since dots are mapped to pixels from the minimum threshold value (0) to (29), the blue noise characteristics are realized comparatively accurately, with a depressed low-frequency component, a sudden peak, and a flat high-frequency component. However, in FIG. 6B, dots are not mapped to threshold values including the minimum value (0 to 29), and instead mapped only to threshold values in the middle (30 to 97), and thus the low-frequency component increases, the peak is softened, and sufficient blue noise characteristics are not obtained. FIG. 6C, in which dots are mapped only to the threshold values 98 to 127, is similar. Additionally, the dispersibility of an image obtained by mapping dots to threshold value region excluding the threshold value region that includes the minimum value (0), as in FIGS. 6B and 6C, becomes lower than the dispersibility of an image obtained by mapping dots to threshold value region including the minimum value, as in FIG. 6A.

In the case of Japanese Patent No. 4059701, in the region of low multi-valued input data In (In=0 to 124), as the value of the multi-valued input data rises by 1, the pixels having a quantized value of 1 increase by 1, and the pixels having a quantized value of 0 (paper white) decrease by 1. Additionally, in this region (In=0 to 124), blue noise characteristics are realized for any gradation. However, in the region (In=125 to 132) near the midpoint (In=128) of the multi-valued input data In, pixels having a quantized value of 0 are maintained even if the value of the multi-valued input data rises by 1, and the quantized value of pixels having a quantized value of 1 is replaced by a value of 2. For this reason, when no distinction is made between the quantized values of 1 and 2, the dot arrangement remains the same.

However, as for pixels having a quantized value of 0 (paper white) in this gradation region (In=125 to 132), frequency characteristics like in FIG. 6C are exhibited, and the region is perceived as being comparatively grainy. In other words, in the case of adopting Japanese Patent No. 4059701, the discontinuity of graininess as illustrated in FIG. 4B is moderated, but the region of comparatively grainy gradations is extended.

SUMMARY OF THE INVENTION

The present invention has been devised in order to solve the above problems, and thus an objective thereof is to provide an image processing apparatus capable of using a threshold value matrix while also outputting an image with excellent dispersibility in each gradation from low gradations to high gradations.

According to a first aspect of the present invention, there is provided an image processing apparatus that converts multi-valued data into multi-valued quantized data having fewer levels than the multi-valued data, comprising: an acquisition unit configured to acquire threshold values in a threshold value matrix having a designated pixel area corresponding to a plurality of pixels in an image, with different threshold values being set according to pixel position; a provisional quantization unit configured to set a provisional quantized value of the quantized data with respect to the multi-valued data, according to which gradation region from among a plurality of gradation regions includes a gradation indicated by the multi-valued data, wherein each of the plurality of gradation regions corresponds to each region obtained by dividing a region of possible gradations that the multi-valued may take into two or more gradation regions; and a quantization unit configured to decide, based on a result of comparing comparative multi-valued data for the multi-valued data corresponding to the position of the gradation of the multi-valued data in the gradation region to the threshold value, whether to set the provisional quantized value set by the provisional quantization unit, a value smaller than the provisional quantized value, or a value larger than the provisional quantized value as a quantized value of the quantized data with respect to the multi-valued data, wherein the quantization unit decides the quantized value so that in a case where the multi-valued data of each pixel in the pixel area is the same intermediate value, pixels having the value larger than provisional quantized value increase, pixels having the provisional quantized value do not change in number, and pixels having the value smaller than the provisional quantized value decrease in the designated pixel area as the value of the multi-valued data rises.

According to a second aspect of the present invention, there is provided an image processing apparatus comprising: a multi-valued data acquisition unit configured to acquire multi-valued data of a pixel to be processed; a threshold value acquisition unit configured to acquire a threshold value, corresponding to the pixel to be processed, to be compared to the multi-valued data; and a generation unit configured to generate, from the multi-valued data and the threshold value, multi-valued quantized data having fewer levels than the multi-valued data, wherein the generation unit generates quantized data having three levels of values (N+1>N>N−1) with respect to the multi-valued data included in a designated gradation region, a peak of frequency characteristics of an image in a case of mapping dots to only pixels having the quantized data equal to N is positioned lower in frequency than a peak of frequency characteristics of an image in a case of mapping dots to only pixels having the quantized data equal to N+1, a peak of frequency characteristics of an image in a case of mapping dots to only pixels having the quantized data equal to N−1 is positioned lower in frequency than a peak of frequency characteristics of an image in a case of mapping dots to only pixels having the quantized data equal to N, and in the designated gradation region, every time the multi-valued data increases, pixels having the quantized data equal to N+1 increase monotonically, pixels having the quantized data equal to N−1 decrease monotonically, and pixels having the quantized data equal to N do not change in number.

According to a third aspect of the present invention, there is provided an image processing method that converts multi-valued data into multi-valued quantized data having fewer levels than the multi-valued data, comprising: acquiring threshold values in a threshold value matrix having a designated pixel area corresponding to a plurality of pixels in an image, with different threshold values being set according to pixel position; setting a provisional quantized value of the quantized data with respect to the multi-valued data, according to which gradation region from among a plurality of gradation regions includes a gradation indicated by the multi-valued data, wherein each of the plurality of gradation regions corresponds to each region obtained by dividing a region of possible gradations that the multi-valued may take into two or more gradation regions; and quantization step for deciding, based on a result of comparing comparative multi-valued data for the multi-valued data corresponding to the position of the gradation of the multi-valued data in the gradation region to the threshold value, whether to set the provisional quantized value set in the provisional quantization value setting step, a value smaller than the provisional quantized value, or a value larger than the provisional quantized value as a quantized value of the quantized data with respect to the multi-valued data, wherein the quantization step decides the quantized value so that in a case where the multi-valued data of each pixel in the pixel area is the same intermediate value, pixels having the value larger than provisional quantized value increase, pixels having the provisional quantized value do not change in number, and pixels having the value smaller than the provisional quantized value decrease in the designated pixel area as the value of the multi-valued data rises.

According to a fourth aspect of the present invention, there is provided an image processing method comprising: acquiring multi-valued data of a pixel to be processed; acquiring a threshold value, corresponding to the pixel to be processed, to be compared to the multi-valued data; and generating, from the multi-valued data and the threshold value, multi-valued quantized data having fewer levels than the multi-valued data, wherein the generating step generates quantized data having three levels of values (N+1>N>N−1) with respect to the multi-valued data included in a designated gradation region, a peak of frequency characteristics of an image in a case of mapping dots to only pixels having the quantized data equal to N is positioned lower in frequency than a peak of frequency characteristics of an image in a case of mapping dots to only pixels having the quantized data equal to N+1, a peak of frequency characteristics of an image in a case of mapping dots to only pixels having the quantized data equal to N−1 is positioned lower in frequency than a peak of frequency characteristics of an image in a case of mapping dots to only pixels having the quantized data equal to N, and in the designated gradation region, every time the multi-valued data increases, pixels having the quantized data equal to N+1 increase monotonically, pixels having the quantized data equal to N−1 decrease monotonically, and pixels having the quantized data equal to N do not change in number.

According to a fifth aspect of the present invention, there is provided a storage medium storing a program causing a computer to function as respective units of an image processing apparatus that converts multi-valued data into multi-valued quantized data having fewer levels than the multi-valued data, the image processing apparatus comprising: an acquisition unit configured to acquire threshold values in a threshold value matrix having a designated pixel area corresponding to a plurality of pixels in an image, with different threshold values being set according to pixel position; a provisional quantization unit configured to set a provisional quantized value of the quantized data with respect to the multi-valued data, according to which gradation region from among a plurality of gradation regions includes a gradation indicated by the multi-valued data, wherein each of the plurality of gradation regions corresponds to each region obtained by dividing a region of possible gradations that the multi-valued may take into two or more gradation regions; and a quantization unit configured to decide, based on a result of comparing comparative multi-valued data for the multi-valued data corresponding to the position of the gradation of the multi-valued data in the gradation region to the threshold value, whether to set the provisional quantized value set by the provisional quantization unit, a value smaller than the provisional quantized value, or a value larger than the provisional quantized value as a quantized value of the quantized data with respect to the multi-valued data, wherein the quantization unit decides the quantized value so that in a case where the multi-valued data of each pixel in the pixel area is the same intermediate value, pixels having the value larger than provisional quantized value increase, pixels having the provisional quantized value do not change in number, and pixels having the value smaller than the provisional quantized value decrease in the designated pixel area as the value of the multi-valued data rises.

Further features of the present invention will become apparent from the following description of exemplary embodiments (with reference to the attached drawings).

BRIEF DESCRIPTION OF THE DRAWINGS

FIGS. 4A and 4B are diagrams illustrating examples of multi-valued quantization using a threshold value matrix;

FIGS. 9A and 9B are distribution diagrams of quantized values for multi-valued input data In;

FIGS. 11A and 11B are distribution diagrams of quantized values for multi-valued input data In; and FIGS. 12A and 12B are distribution diagrams of quantized values for multi-valued input data In.

DESCRIPTION OF THE EMBODIMENTS

Example 1

Figure 1:
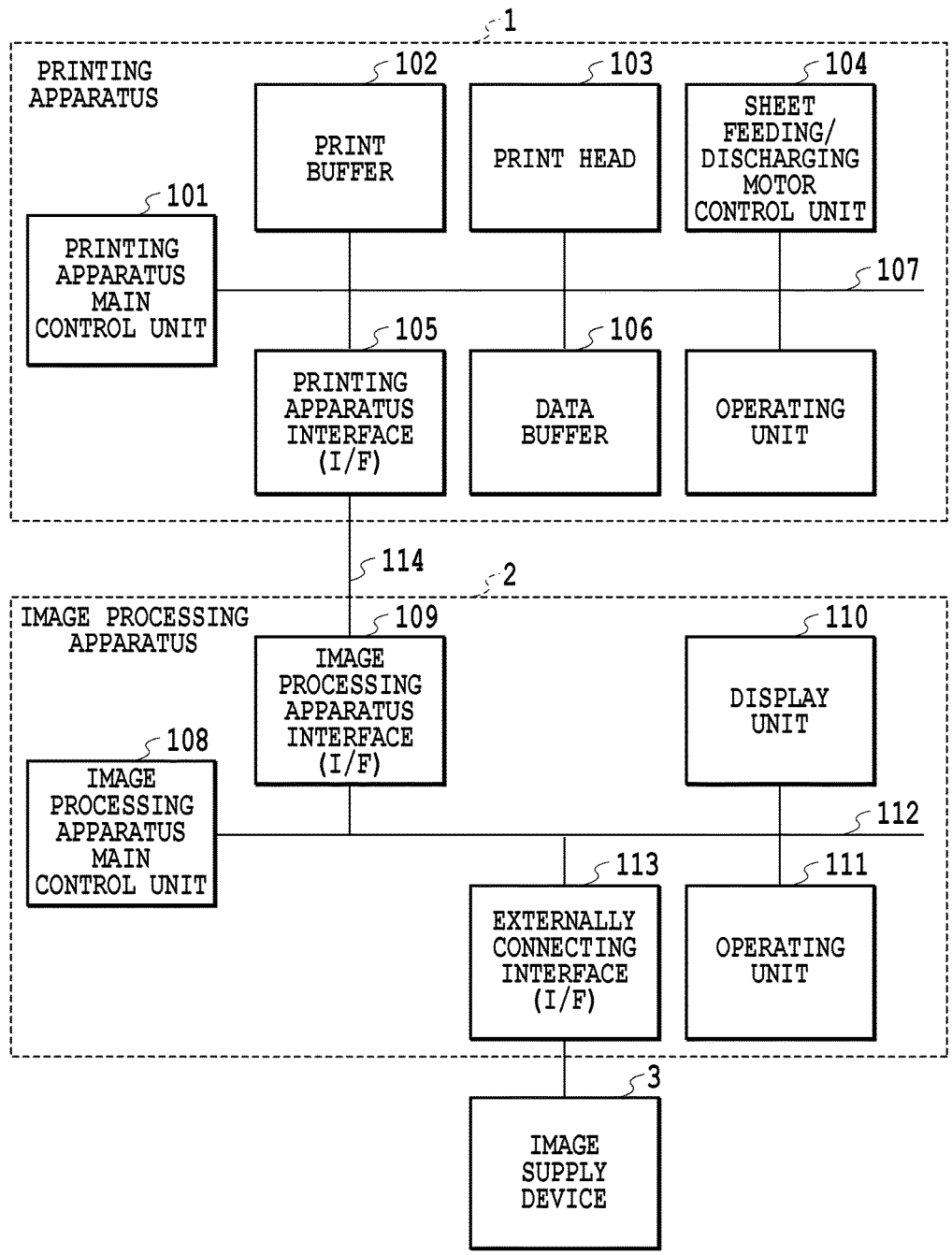
FIG. 1 is a block diagram illustrating the control configuration of an inkjet printing system.

FIG. 1 is a block diagram illustrating the control configuration of an inkjet printing system applicable to the present invention. The inkjet printing system in Embodiment 1 is configured to include an image supply device 3, an image processing apparatus 2, and an inkjet printing apparatus 1 (hereinafter also simply referred to as a printing apparatus). Image data supplied from the image supply device 3 is subjected to a predetermined image process by the image processing apparatus 2, and then sent to the printing apparatus 1, and printed.

In the printing apparatus 1, a printing apparatus main control unit 101 is one for controlling the whole of the printing apparatus 1, and configured to include a CPU, ROM, RAM, and the like. A print buffer 102 can store image data before transfer to a print head 103 as raster data. The print head 103 is an inkjet type print head having multiple printing elements capable of ejecting inks as droplets, and in accordance with image data stored in the print buffer 102, ejects inks from respective printing elements. In Embodiment 1, it is assumed printing element arrays for the four colors of cyan, magenta, yellow, and black are arrayed on the print head 103.

A sheet feeding/discharging motor control unit 104 controls conveyance of print media and sheet feeding/discharging. A printing apparatus interface (I/F) 105 transceives a data signal with the image processing apparatus 2. An I/F signal line 114 connects the both. As for the type of the I/F signal line 114, one specified by the Centronics Data Computer Corporation can be applied, for example. A data buffer 106 temporarily stores image data received from the image processing apparatus 2. A system bus 107 connects the respective functions of the printing apparatus 1.

Figure 2:
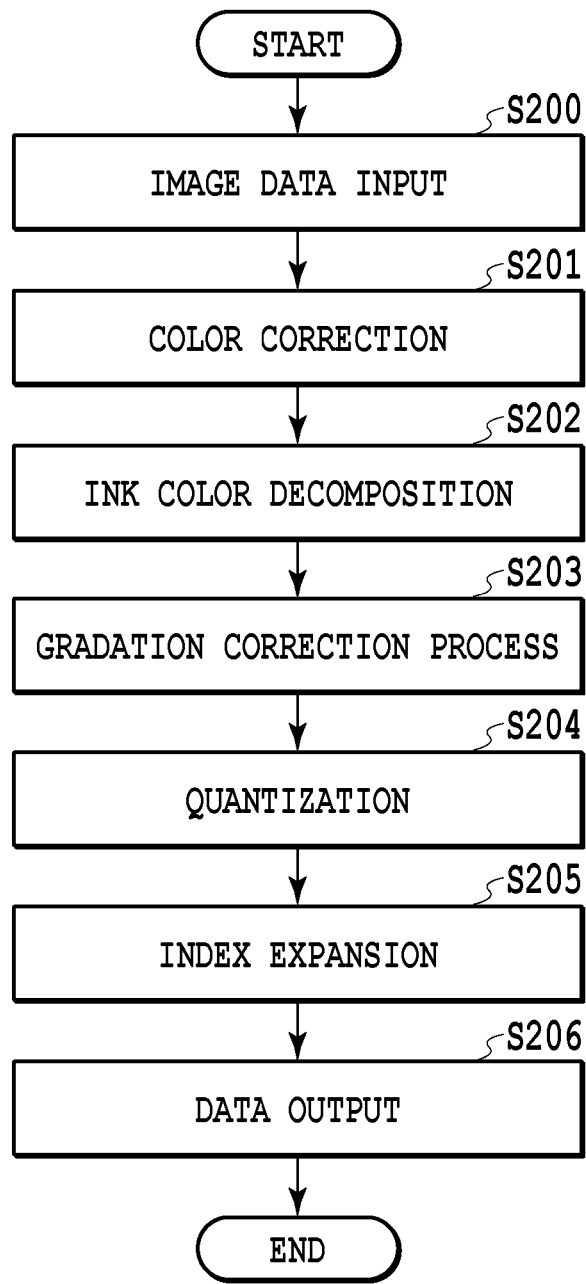
FIG. 2 is a flowchart for explaining an image data process.
Figure 3:
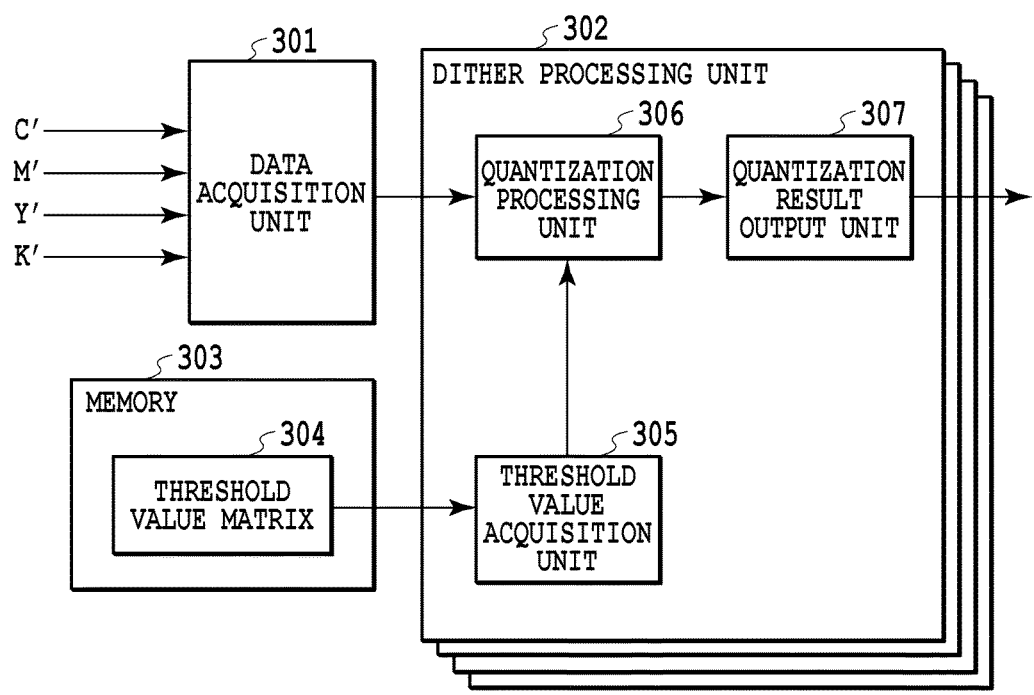
FIG. 3 is a block diagram for explaining the details of a quantization process.
Figure 5A:
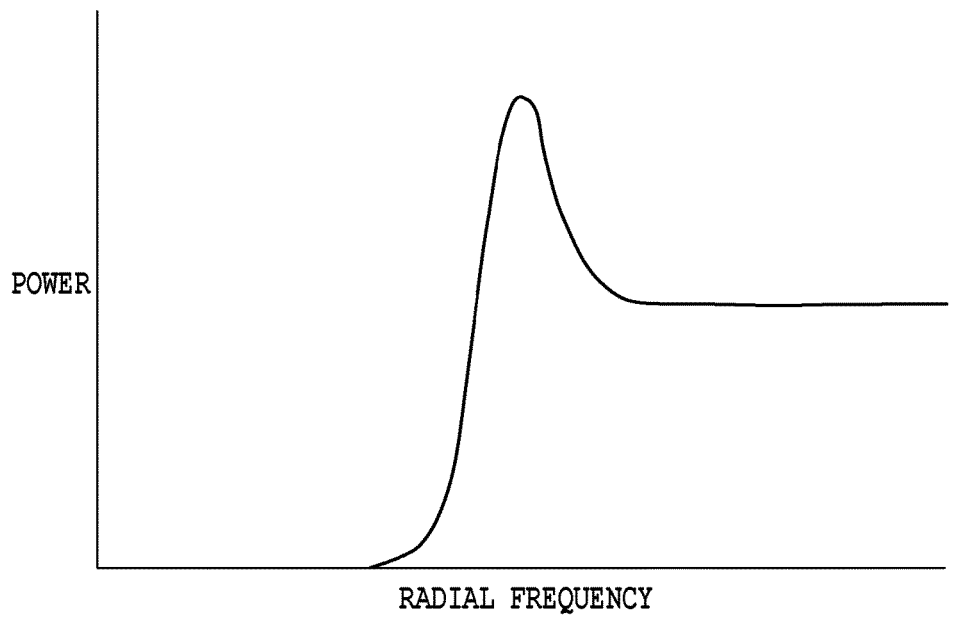
FIGS. 5A and 5B are comparative diagrams of blue noise characteristics and the visual transfer function.
Figure 5B:
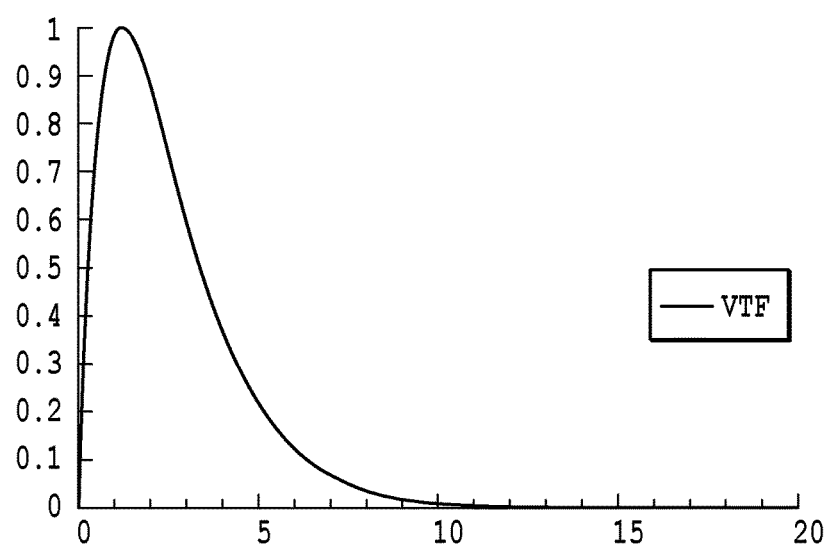
Figure 8A:
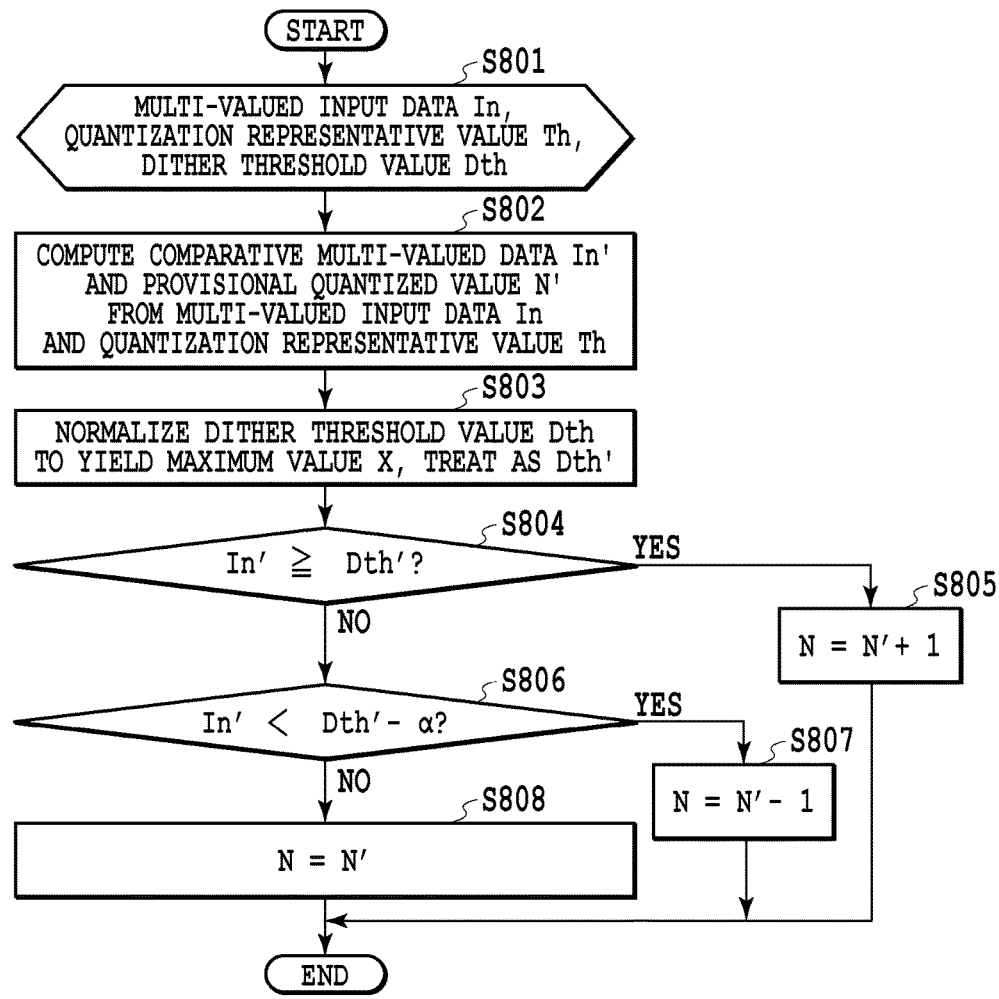
FIGS. 8A and 8B are diagrams illustrating the steps and results of the multi-valued quantization process according to the present invention.

On the other hand, in the image processing apparatus 2, an image processing apparatus main control unit 108 is one for performing various processes on an image supplied from the image supply device 3, and thereby generating image data printable by the printing apparatus 1, and includes a CPU, ROM, RAM, and the like. The below-described quantization configuration of the present invention illustrated in FIG. 3 is also provided in the image processing apparatus main control unit 108, and flowcharts to be described with FIGS. 2 and 8A are executed by the CPU of the image processing apparatus main control unit 108. Also, lookup tables and threshold value matrices used in these flowcharts are stored in advance in the ROM inside the image processing apparatus main control unit 108, for each type of print media and print mode. An image processing apparatus interface (I/F) 109 transceives a data signal with the printing apparatus 1. An externally connecting interface (I/F) 113 transceives image data and the like with the image supply device 3 externally connected. A display unit 110 displays various information to a user. An LCD or the like may be applied, for example. An operating unit 111 is a mechanism for a user to perform command operations. A keyboard and mouse may be applied, for example. A system bus 112 connects the image processing apparatus main control unit 108 and the respective functions to each other.

FIG. 2 is a flowchart for explaining an image data process performed by the image processing apparatus main control unit 108. This process is performed by the CPU provided in the image processing apparatus main control unit 108 in accordance with a program stored in the ROM. In FIG. 2, when image data on a target pixel is inputted from the image supply device 3 (Step S200), the image processing apparatus main control unit 108 first makes a color correction in Step S201. The image data received by the image processing apparatus 2 from the image supply device 3 includes pieces of R (red), G (green), and B (blue) 8-bit luminance data for expressing a standardized color space such as sRGB. In Step S201, these pieces of luminance data are converted to pieces of RGB 8-bit luminance data corresponding to a color space specific to the printing apparatus. As a method for converting the signal values, a publicly known method such as a method that refers to a lookup table (LUT) preliminarily stored in the ROM or the like can be employed.

In Step S202, the image processing apparatus main control unit 108 decomposes the converted pieces of RGB data into pieces of 8-bit, 256-value gradation data (density data) respectively for C (cyan), M (magenta), Y (yellow), and K (black) which are the ink colors of the printing apparatus. In this step, an 8-bit grayscale image is generated for each of four channels (four colors). In the ink color decomposition process as well, a lookup table (LUT) preliminarily stored in the ROM or the like can be referred to as in the color correction process.

In Step S203, the image processing apparatus main control unit 108 performs a gradation correction process on each of CMYK. Typically, the number of dots to be printed on a print medium, and the optical density realized on the print medium by that number of dots, do not exist in a linear relationship. Consequently, the number of dots to be printed on the print medium is adjusted by applying a linear transformation to the multi-valued color signal data CMYK in order to make the relationship linear. Specifically, one-dimensional lookup tables prepared in correspondence with the individual ink colors are referenced to convert the 8-bit, 256-value CMYK to similar 8-bit, 256-value C'M'Y'K'.

In step S204, the image processing apparatus main control unit 108 performs a predetermined quantization process on C'M'Y'K' to convert to quantized data of a few bits. For example, in the case of quantization into 3-level, the 8-bit multi-valued input data from 0 to 255 is converted to 2-bit data from 0 to 2. This quantization process will be explained in detail later.

In the subsequent Step S205, the image processing apparatus main control unit 108 performs an index expansion process. Specifically, from among multiple dot arrangement patterns determining the number and position of dots to print at individual pixels, one dot arrangement pattern is selected in association with a quantized value obtained in Step S204. Subsequently, the dot data is output as binary data (Step S204). This completes the above process. Note that in FIG. 2, an index expansion process that associates dot patterns with quantized values in a 1-to-1 manner is prepared, but if the print head 103 is capable of printing large and small dots, the quantized value 2 may be associated with and printed using large dots, while the quantized value 1 may be associated with and printed using small dots.

FIG. 3 is a block diagram for explaining the mechanism that executes the quantization process of Step S204 in FIG. 2. The quantization process in the present invention is performed in accordance with a dither method.

An image data acquisition unit 301 acquires 8-bit multi-valued gradation data C'M'Y'K' indicating the densities of individual pixels for each ink color, and forwards this data to a dither processing unit 302. Since the process by the dither processing unit 302 is performed in parallel on each of C'M'Y' K', the following will describe the processing of multi-valued input data In for one color.

In the dither processing unit 302, the 8-bit multi-valued input data to be quantized is transmitted as-is to a quantization processing unit 306. Meanwhile, a threshold value acquisition unit 305 accesses memory 303, acquires a relevant threshold value matrix 304, selects the threshold value corresponding to the coordinates of the multi-valued input data In from among the arrayed threshold values, and transmits the selected threshold value to the quantization processing unit 306. A threshold value matrix 304 of the present embodiment includes a 16×16 pixel area, and is formed by arraying respective threshold values from 0 to 127 for every two pixels so as to have blue noise characteristics. The quantization processing unit 306 performs a designated quantization process using the multi-valued input data In and the dither threshold value Dth acquired from the threshold value acquisition unit 305, and outputs quantized data having a quantized value of 0, 1, or 2 for each pixel.

Hereinafter, in order to explain the multi-valued quantization process characteristic of Example 1, a typical multi-valued quantization process of the related art will be explained first.

Figure 7A:
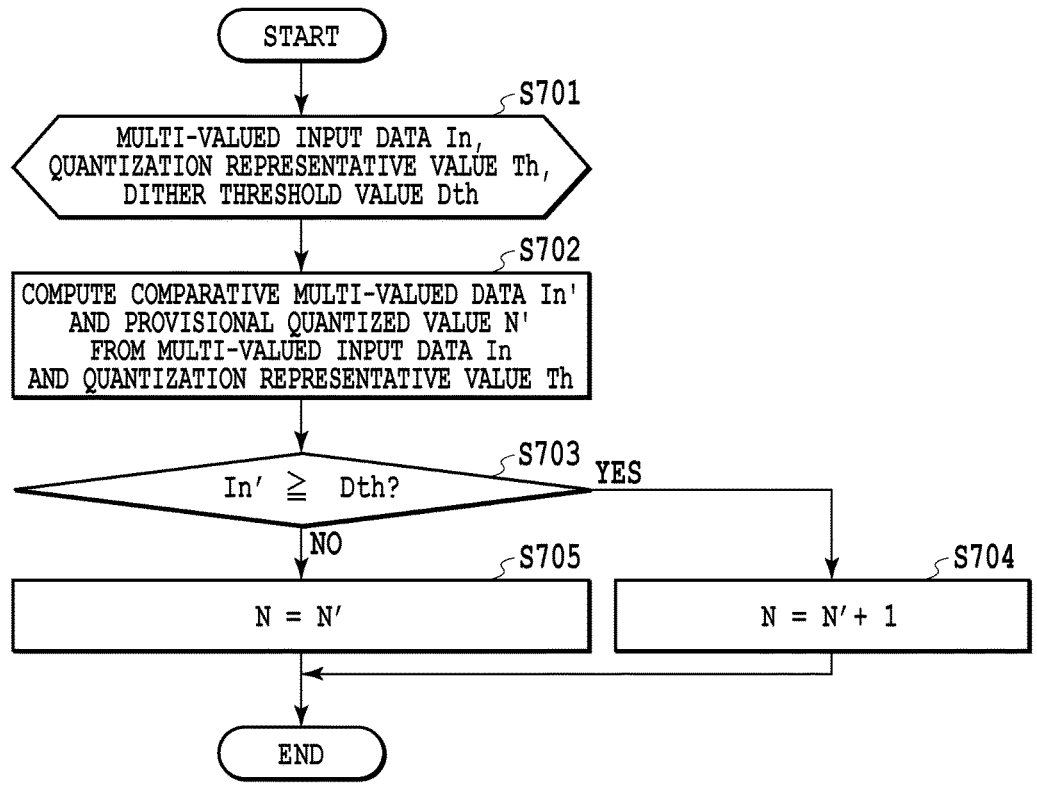
FIGS. 7A and 7B are diagrams illustrating the steps and results of a typical multi-valued quantization process.
Figure 7B:
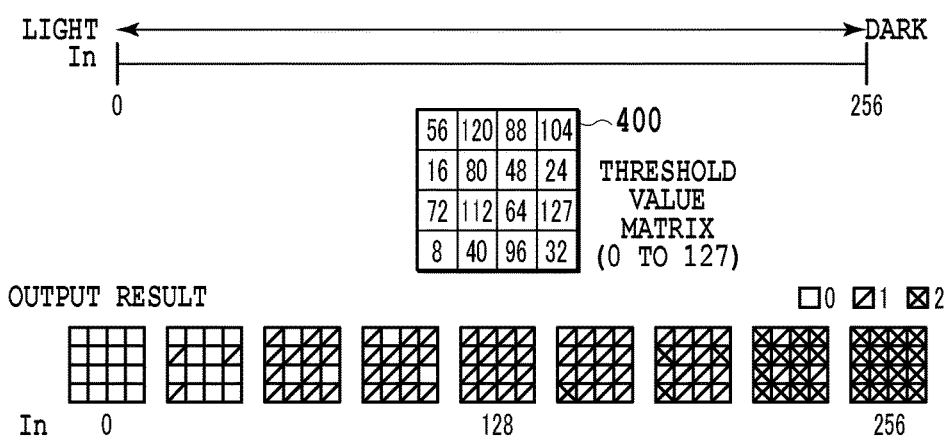

FIGS. 7A and 7B are diagrams for explaining the steps and results of a typical multi-valued quantization process of the related art. FIG. 7A is a flowchart for explaining the quantization process for one pixel executed by the quantization processing unit 306. When multi-valued input data In for one pixel is inputted, first the quantization processing unit 306 prepares a quantization representative value Th and a dither threshold value Dth in Step S701.

The quantization representative value Th is a boundary value for dividing the multi-valued input data In into multiple regions as explained with FIGS. 4A and 4B. The value and number of such boundary values are determined in correspondence with the gradation range of the multi-valued input data In, and the number of levels of quantized values. In the case of quantizing multi-valued input data In having 256 gradations from 0 to 255 into three values (0, 1, 2), the 256 gradations are divided into two areas, and thus in the case of equal division, 256/(3−1)=128 becomes the quantization representative value Th. The description that follows presumes equal division. On the other hand, the dither threshold value Dth is a value mapped to a position corresponding to the coordinates (x, y) of the multi-valued input data In in the threshold value matrix acquired by the threshold value acquisition unit 305.

In Step S702, the quantization processing unit 306 uses Expression 1 to compute a provisional quantized value N' and comparative multi-valued data In'.

$$In/Th = N' r In'$$ (Expression 1)

In other words, the quotient obtained by dividing the multi-valued input data In by the quantization representative value Th becomes the provisional quantized value N', while the remainder becomes the comparative multi-valued data In'. In the case of dividing the gradation region of the multi-valued input data In into multiple regions and not equal division, the multi-valued input data In is compared to a predetermined quantization representative value Th, and the provisional quantized value N' is set according to the magnitude relationship.

In Step S703, the quantization processing unit 306 compares the comparative multi-valued data In' obtained in Step S702 to the dither threshold value Dth. Subsequently, if In'<Dth, the process proceeds to Step S705, the provisional quantized value is set as the quantized value (N=N'), and the process ends. On the other hand, if In'≥Dth, the process proceeds to Step S704, where a value equal to the provisional quantized value N' plus 1 is set as the quantized value (N=N'+1), and the process ends.

FIG. 7B is a diagram illustrating the quantization results in the case of performing the above quantization process. FIG. 7B illustrates 4×4 pixel areas in the case of using the threshold value matrix 400 to quantize multi-valued input data In having a gradation area from 0 to 255 into 3-level having a smaller number of gradations from Level 0 to 2. When the multi-valued input data In is uniformly 0, the quantized value of all pixels inside the 4×4 area is N=0. Also, as the multi-valued input data In increases, the number of N=0 pixels decreases and the number of N=1 pixels increases, such that at In=Th=128, the quantized value of all pixels becomes N=1. In addition, when In is equal to or greater than 0 but less than 128, the quantized values become a mixture of N=0 and N=1.

As the multi-valued input data In exceeds 128 and increases further, now the N=1 pixels decrease and N=2 pixels start to increase, such that at In=255 (max), the quantized value of all pixels becomes N=2. In this way, in the gradation area where In is from 128 to 255, the quantized values become a mixture of N=1 and N=2.

Figure 8B:
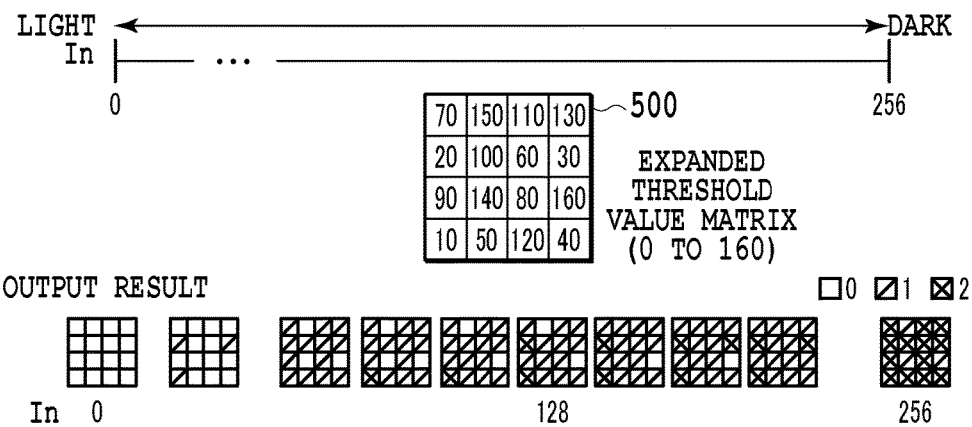

On the other hand, FIGS. 8A and 8B are diagrams for explaining the steps and results of the multi-valued quantization process of Embodiment 1. Since Steps S801 and S802 are similar to Steps S701 and S702 of FIG. 7A, description will be omitted.

In Step S803, the quantization processing unit 306 performs an expansion process on the dither threshold value Dth. Specifically, Expression 2 is used to compute an expanded dither threshold value Dth' so that the gradation region of the threshold value (1 to 127) is expanded to a wider region (0 to 160, for example).

$$Dth' = Dth \times (160/127)$$ (Expression 2)

In the subsequent Step S804, the quantization processing unit 306 compares the comparative multi-valued data In' obtained in Step S802 to the expanded dither threshold value Dth' obtained in Step S803. Subsequently, if In'≥Dth', the process proceeds to Step S805, where a value equal to the provisional quantized value N' plus 1 is set as the quantized value (N=N'+1), and the process ends. On the other hand, if In'<Dth', the process additionally proceeds to Step S806.

In Step S806, the quantization processing unit 306 compares the comparative multi-valued data In' to the value (Dth'−α) obtained by subtracting a designated value α from the expanded dither threshold value Dth'. Subsequently, if In'≥(Dth'−α), the process proceeds to Step S808, where the provisional quantized value N' is set as the quantized value (N=N'), and the process ends. On the other hand, if In'<(Dth'−α), the process proceeds to Step S807, where a value equal to the provisional quantized value N' minus 1 is set as the quantized value N (N=N'−1), and the process ends.

FIG. 8B is a diagram illustrating the quantization results in the case of performing the quantization process of Embodiment 1. FIG. 8B illustrates 4×4 pixel areas in the case of using a threshold value matrix 500, which is the result of performing the expansion process on the threshold value matrix 400 used in FIG. 7B, to quantize multi-valued input data In having a gradation area from 0 to 255 into three values from Level 0 to 2. At In=128, not all pixels have a quantized value of N=1, and instead there is a mixture of N=0, N=1, and N=2. In this way, in the gradation area where In is from 0 to 128, the quantized values are a mixture of N=0, N=1, and N=2.

According to the method of the related art described with FIG. 7A, in the comparison of the comparative multi-valued data In' and the dither threshold value Dth, the following is upheld:
When In'<Dth, N=N'
When Dth≤In', N=N'+1

Only two possible values are generated for quantized value N: the provisional quantized value N', or the value equal to the provisional quantized value N' plus 1. In contrast, in the case of Embodiment 1 described with FIG. 8A, in the comparison of the comparative multi-valued data In' and the expanded dither threshold value Dth', the following is upheld:
When In'<Dth'−α, N=N'−1
When Dth'−α≤In'<Dth', N=N'
When Dth'≤In', N=N'+1

Three possible values are generated for the quantized value N: the provisional quantized value N', the value equal to the provisional quantized value minus 1, and the value equal to the provisional quantized value N' plus 1. Herein, the constant α is configured so that a number of pixels corresponding to the expansion amount of the dither threshold value Dth (160−128=32) are set to the quantized value (N=N'−1). Thus, α=128.

A specific example will be described. For example, in the case of multi-valued input data In=140, Expression 1 gives 140/128=1 r 12

Thus, the provisional quantized value becomes N'=1, while the comparative multi-valued data becomes In'=12. At this point, for example, for a pixel with an expanded dither threshold value Dth'=160, the above relationship In'<Dth'−α is satisfied (that is, 12<160−128), and thus the final quantized value becomes N=1−1=0.

Also, for a pixel with Dth'=137, the above relationship Dth'≤In' is satisfied (that is, 137−128<12<137), and thus the final quantized value N becomes N=N'=1.

Furthermore, for a pxiel with Dth'=10, the above relationship Dth'−α≤In'<Dth' is satisfied (that is, 10≤12), and thus the quantized value N becomes N=N'+1=2.

According to similar calculations, for pixels with an expanded dither threshold value Dth' from 0 to 12, the quantized value becomes N=2, while for pixels from 13 to 140, the quantized value becomes N=1, and for pixels from 141 to 160, the quantized value becomes N=0. Such output results in the case of multi-valued input data In=140 correspond to the fifth pattern from the left in FIG. 8B.

Also, in the case of multi-valued input data In=165, for example, Expression 1 becomes 165/128=1 r 37, and thus the provisional quantized value becomes N'=1, and the comparative multi-valued data becomes In'=37. At this point, for a pixel with an expanded dither threshold value Dth'=160, the above relationship Dth'−α≤In'<Dth' is satisfied (that is, 160−128≤37<160), and thus the quantized value N becomes N=N'=1.

Also, for a pixel with Dth'=0, the above relationship Dth'≤In' is satisfied (that is, 0≤37), and thus the quantized value N becomes N=N'+1=2.

According to similar calculations, for pixels with an expanded dither threshold value Dth' from 0 to 37, the quantized value becomes N=2, while for pixels from 38 to 160, the quantized value becomes N=1. Such output results in the case of multi-valued input data In=165 correspond to the ninth pattern from the left in FIG. 8B.

In this way, in the quantization results of Embodiment 1 illustrated in FIG. 8B, multiple types of quantized values are always included in the pixel area for any gradation (intermediate value) except In=0 and In=255. Consequently, not all pixels are uniformly set to the same quantized value like in the case of In=128 in FIG. 7B, and the same dot pattern is not arrayed uniformly. As a result, there are no gradations with extremely low graininess, and pseudo contours may be suppressed.

In this way, according to Embodiment 1, the quantized values may be distributed among three values only for specific gradations. Additionally, at this point, by changing the ratio by which to expand the gradation area of the threshold value and changing the constant α to adjust the range of the specific gradations, it becomes possible to suppress the extreme variations in graininess which cause pseudo contours, while also minimizing graininess overall. Also, since it is sufficient to prepare a single threshold value matrix shared in common among all quantized values, the memory capacity may be kept smaller compared to a configuration of the related art that requires a memory area equal to the memory area for storing a single threshold value matrix multiplied by a number corresponding to the number of quantized values.

Note that sufficiently small multi-valued input data In may become N=−1 in the determination according to the above expressions, but in these cases, it is sufficient to forcibly set N=0. Even if N=−1 is forcibly set to N=0, the pixel positions where N−1 are the area where the threshold value is greatest, and thus the graininess is not worsened.

In addition, as another method for not producing N=−1, the provisional quantized value may be preliminarily set not to the quotient obtained by dividing the multi-valued input data In by the quantization representative value Th, but to a value equal to the quotient minus 1. In this case, it is sufficient to set the process in Step S805 to N=N'+2, the process in Step S807 to N=N', and the quantized value N to N=N'+1 when the relationship In'≥Dth'−α is judged to be true in Step S806.

Meanwhile, as already described in the Description of the Related Art, Japanese Patent No. 4059701 also discloses a method for mixing three levels of quantized values within the area of a specific gradation area. However, as already described in the section on the technical problem, according to Japanese Patent No. 4059701, a first threshold value matrix storing threshold values (0 to 127) and a second threshold value matrix storing threshold values (128 to 255) are prepared. For this reason, compared to Embodiment 1 which uses only a single threshold value matrix, Japanese Patent No. 4059701 requires a memory capacity equal to the memory area for storing a single threshold value matrix multiplied by a number corresponding to the number of levels.

In addition, according to Japanese Patent No. 4059701, several high-level threshold values from among the threshold values arrayed in a first matrix are exchanged with several low-level threshold values from among the threshold values arrayed in a second matrix. For this reason, in the gradation area near an input value of 128, as the value of multi-valued input data In rises by 1, the pixels with a quantized value of N=0 are maintained as-is, while the pixels with N=1 are replaced by N=2.

In contrast, in Embodiment 1, a single threshold value matrix storing threshold values (0 to 127) is used. Additionally, three levels of quantized values N, N+1, and N−1 are obtained on the basis of the magnitude relationship between the expanded dither threshold value Dth' computed from the single threshold value matrix, and the comparative multi-valued input data In'. For this reason, even in the gradation area near the multi-valued input data In=128, as the value of multi-valued input data In rises by 1, the pixels with a quantized value of N=1 are maintained as-is, while the pixels with N=0 are replaced by N=2.

Figure 9A:
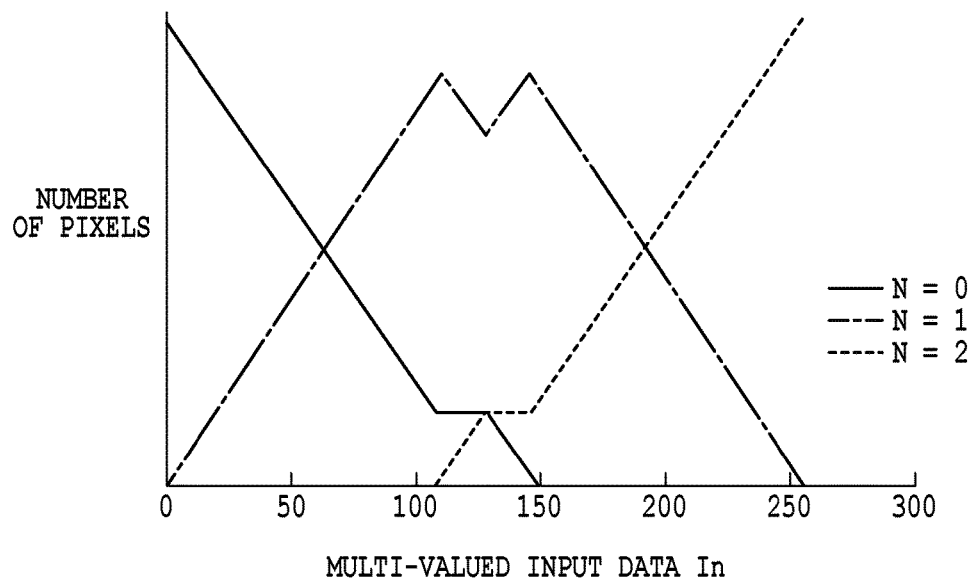
Figure 9B:
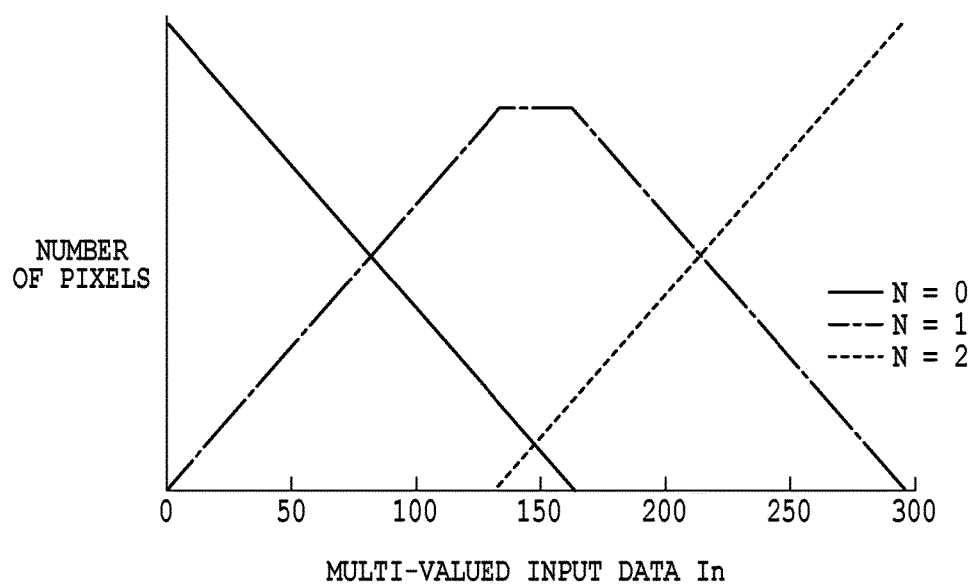

FIGS. 9A and 9B are diagrams illustrating distributions of the numbers of pixels having the quantized value N set to N=0, N=1, and N=2 for the multi-valued input data In. FIG. 9A illustrates the distribution of the numbers of pixels in the case of performing the multi-valued quantization of Japanese Patent No. 4059701, while FIG. 9B illustrates the case of performing the quantization process of Embodiment 1.

Figure 6A:
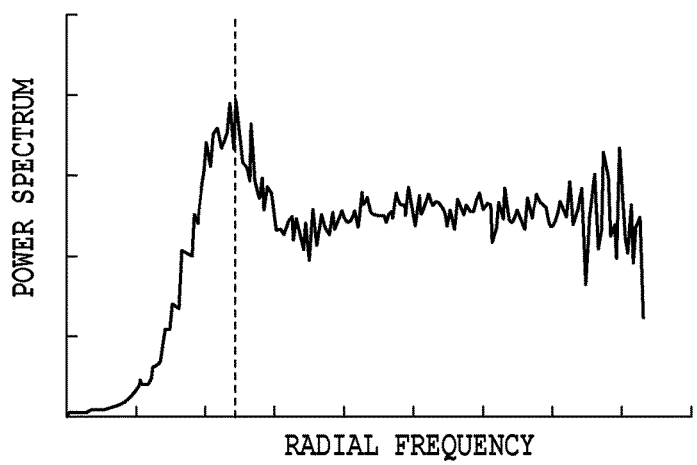
FIGS. 6A to 6C are the frequency characteristics when mapping dots to specific threshold value regions.
Figure 6B:
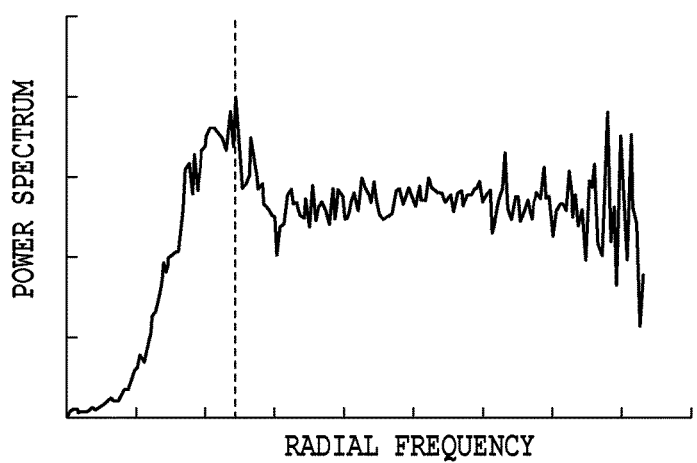

The case of Japanese Patent No. 4059701, referring to FIG. 9A, in the region of multi-valued input data In=0 to 100, as the value of the multi-valued input data In rises by 1, the pixels with a quantized value N=0 gradually decrease, and the pixels with N=1 increase monotonically. In such a gradation region, the first threshold value matrix storing threshold values (0 to 127) is used, but since this threshold value matrix has blue noise characteristics, the N=1 dot patterns are arranged in a highly dispersed state, and frequency characteristics as illustrated in FIG. 6A are realized.

As the multi-valued input data approaches In=128, the quantized values of pixels already set to the quantized value N=1 are changed from N=1 to N=2. At this point, the positions and numbers of pixels set to the quantized value N=0 are maintained. Subsequently, after the multi-valued input data exceeds In=128, the pixels with the quantized value N=0 decrease monotonically again, and the pixels with N=1 increase monotonically.

Figure 6C:
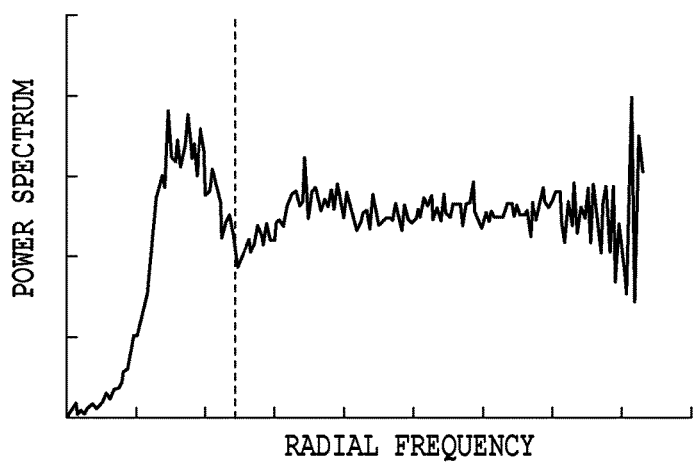

In the gradation region near the multi-valued input data In=128, N=1 and N=2 are mapped in order from the position of smallest value among the threshold values arrayed in the threshold value matrix. Thus, a highly dispersed dot pattern having frequency characteristics like in FIG. 6A is realized. However, on the other hand, the N=0 (paper white) area is the pixel area of the remaining large threshold values where N=1 and N=2 are not mapped. Thus, the area has frequency characteristics with a peak on the low-frequency side like in FIG. 6C, the paper white area with strong contrast compared to the surroundings is readily noticed, and a comparatively high graininess is perceived. In other words, in the case of adopting Japanese Patent No. 4059701, the discontinuity of graininess as illustrated in FIG. 4B is moderated, but the gradation region of comparatively grainy is extended.

On the other hand, in the case of Embodiment 1, referring to FIG. 9B, the number of pixels with the quantized value N=0 reaches a maximum when the multi-valued input data In=0, and monotonically decreases at a fixed slope as the value of the multi-valued input data In rises by 1. In other words, for the readily noticeable paper white, the gradation area with comparatively high graininess is not extended, and the continuity of graininess with respect to the multi-valued input data In may be maintained.

Note that in the above, the gradation region of the multi-valued input data In is equally divided by the gradation region of the dither threshold value Dth for the sake of simplicity, but sizes of the regions of the comparative multi-valued input data In' after division may also be different from each other, and the respective regions may also not be equal to the gradation region of the dither threshold value Dth. In the case of division into multiple areas of different size, in Step S802, it is sufficient to compare the multi-valued input data In to the predetermined quantization representative value Th, and set the provisional quantized value N' according to the magnitude relationship. The respective regions are then normalized to be equal to the gradation region of the dither threshold value Dth. After that, the expansion process may be performed on the dither threshold value Dth in Step S803.

In addition, in the above, the threshold value acquisition unit 305 reads a threshold value matrix stored in the memory 303, and in Step S803, the quantization processing unit 306 computes the dither threshold value Dth' by performing computations like in Expression 2 on the dither threshold value Dth for each individual pixel. However, if the threshold value matrix to use and the expansion ratio (160/127) are preset values, the expanded dither threshold value Dth' may also be stored in advance in the memory 303. According to such a configuration, the computing step for acquiring the expanded dither threshold value Dth' (Step S803) may be omitted, enabling a decreased processing load and a faster processing speed.

As described above, according to Embodiment 1, an image with the graininess reduced to some degree for all gradations may be output without impairing the continuity of graininess with respect to the multi-valued input data In. Also, according to Embodiment 1, since it is sufficient to prepare a single threshold value matrix shared in common among all quantized values, the memory capacity may be kept smaller compared to a configuration of the related art that requires a memory area equal to the memory area for storing a single threshold value matrix multiplied by a number corresponding to the number of quantized values.

Embodiment 2

In Embodiment 2, the image processing apparatus described in FIGS. 1 to 3 is used. In Embodiment 1, an expansion process is performed on the dither threshold value Dth from 0 to 127, but in Embodiment 2, an expansion process is performed on the multi-valued input data In.

Figure 10:
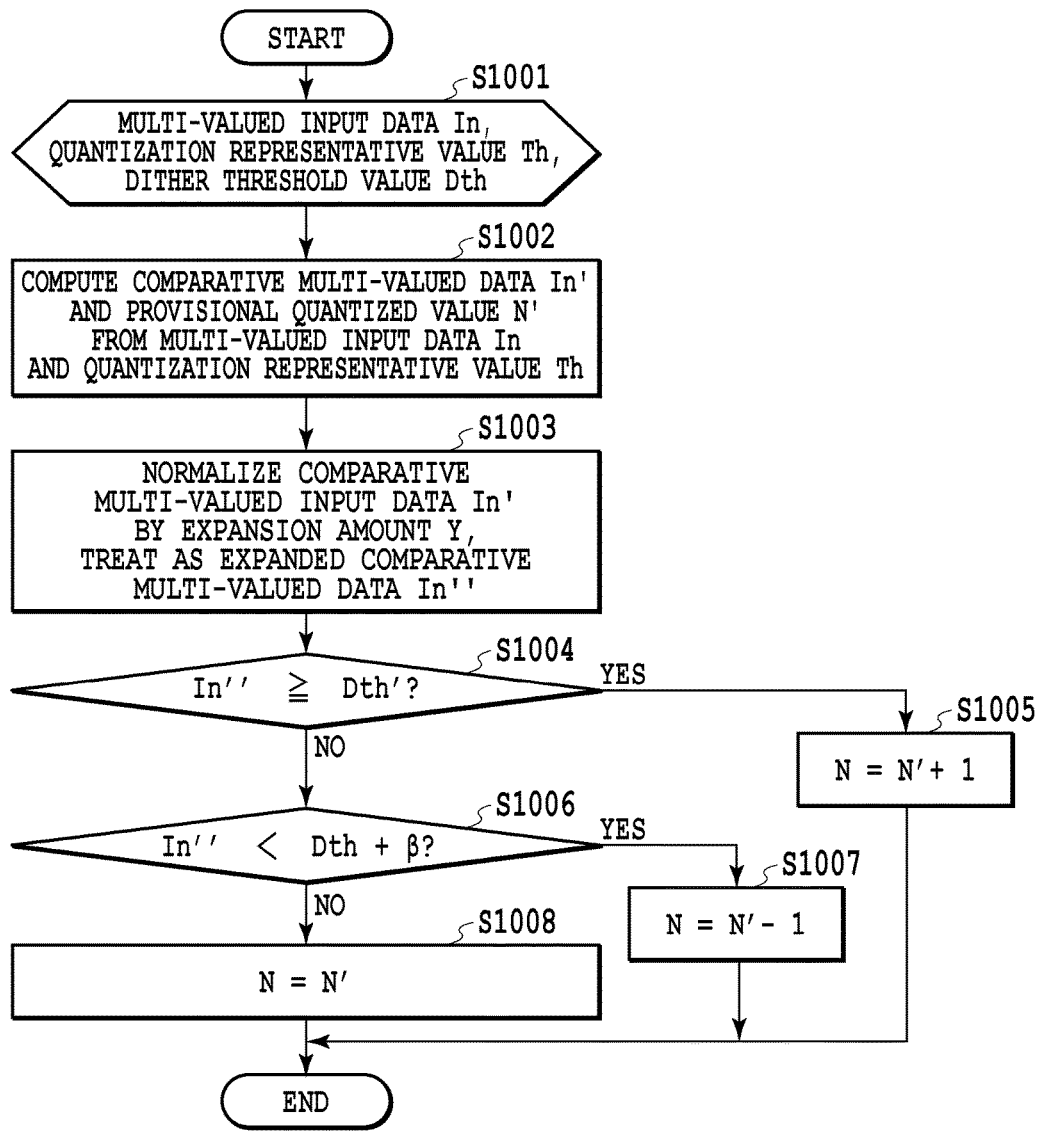
FIG. 10 is a flowchart for explaining the steps of the multi-valued quantization process according to Example 2.

FIG. 10 is a flowchart for explaining the steps of the multi-valued quantization process according to Embodiment 2. Since Steps S1001 and S1002 are similar to Steps S701 and S702 of FIG. 7A, description will be omitted.

In Step S1003, the quantization processing unit 306 performs an expansion process on the comparative multi-valued data In'. Specifically, Expression 3 is used to compute expanded comparative multi-valued data In so that the gradation region (1 to 127) of the comparative multi-valued data In' is expanded by an expansion amount Y=32.

$$In''=In' \times (128+32)/127 \quad \text{(Expression 3)}$$

In the subsequent Step S1004, the quantization processing unit 306 compares the expanded comparative multi-valued data In obtained in Step S1003 to the dither threshold value Dth obtained in Step S1002. Subsequently, if In"≥Dth, the process proceeds to Step S1005, where a value equal to the provisional quantized value N' plus 1 is set as the quantized value N (N=N'+1), and the process ends. On the other hand, if In"<Dth, the process additionally proceeds to Step S1006.

In Step S1006, the quantization processing unit 306 compares the expanded comparative multi-valued data In to the value (Dth+β) obtained by adding a designated value β to the dither threshold value Dth. Subsequently, if In"≥(Dth+β), the process proceeds to Step S1008, where the provisional quantized value N' is set as the quantized value (N=N'), and the process ends. On the other hand, if In"< (Dth+β), the process proceeds to Step S1007, where a value equal to the provisional quantized value N' minus 1 is set as the quantized value N (N=N'−1), and the process ends.

According to Embodiment 2, in the comparison of the expanded comparative multi-valued data In and the dither threshold value Dth, the following is upheld:
When In"<Dth+β, N=N'−1
When Dth+β≤In"<Dth, N=N'
When Dth≤In", N=N'+1

Three possible values are generated for the quantized value N: the provisional quantized value N', the value equal to the provisional quantized value minus 1 (N'−1), and the value equal to the provisional quantized value plus 1 (N'+1). Herein, β is configured so that the number of pixels corresponding to the expansion amount Y=32 of the comparative multi-valued data become the quantized value (N=N−1). Thus, β=128−32=96.

A specific example will be described. For example, in the case of multi-valued input data In=140, Expression 1 becomes 140/128=1 r 12, and thus the provisional quantized value becomes N'=1, and the comparative multi-valued data becomes In'=12. Additionally, assuming the expansion amount Y=32, according to Expression 3, the expanded comparative multi-valued data becomes In"=12×((128+32)/127)=15. Consequently, for a pixel with a dither threshold value Dth=128, for example, the above relationship In"<Dth+β is satisfied (that is, 15<128+96), and thus the quantized value becomes N=N'−1=0.

Also, for a pixel with Dth=100, the above relationship Dth≤In"<Dth+β is satisfied (that is, 100<140<100+96), and thus the final quantized value N becomes N=N'=1.

Furthermore, for a pixel with Dth=10, the above relationship Dth≤In" is satisfied (that is, 10≤15), and thus the final quantized value becomes N=N'+1=2.

In this way, according to Embodiment 2, the magnitude relationship between the dither threshold value Dth and the expanded comparative multi-valued data In is divided into three levels via the constant β, thereby enabling quantized values to be assigned to three values only for specific gradations. Additionally, at this point, by changing the ratio by which to expand the gradation region of the comparative multi-valued data In' and changing the constant β to adjust the region of the specific gradations, it becomes possible to suppress the extreme variations in graininess which cause pseudo contours, while also minimizing graininess overall.

Note that in Embodiment 2, similarly to Embodiment 1, pixels for which N=−1 may be forcibly set to N=0. Also, similarly to Embodiment 1, it is also possible to avoid producing N=−1 by taking the provisional quantized value to be the value obtained by preliminarily subtracting 1 from the quotient of the multi-valued input data In divided by the quantization representative value Th.

Furthermore, Embodiment 2 that conducts the quantization process after expanding the multi-valued input data is able to perform the processing steps preceding the quantization process described in FIG. 2 (Steps S201 to S203) with a smaller number of bits than the number of bits required for quantization. For this reason, in the case of executing these processes in hardware, the access zone of the RAM may be decreased over the related art.

Note that likewise in Embodiment 2, the sizes of the regions of the comparative multi-valued input data In' after division may also be different from each other, and the respective regions may also not be equal to the gradation region of the dither threshold value Dth. In the case of division into multiple areas of different size, in Step S1002, it is sufficient to compare the multi-valued input data In to the predetermined quantization representative value Th, and set the provisional quantized value N' according to the magnitude relationship. The respective regions are then normalized to be equal to the gradation region of the dither threshold value Dth. After that, the expansion process may be performed on the normalized comparative multi-valued input data in Step S1003.

Additionally, regarding the flowchart described with FIG. 10, in Step S1003, the expanded multi-valued input data In is computed by multiplying the individual pieces of the multi-valued input data In' by a designated coefficient. However, if the coefficient used in the multiplication is clearly fixed, a one-dimensional lookup table associating the multi-valued input data In' and the expanded multi-valued input data In" in a 1-to-1 manner may also be prepared in advance. By configuring in this way, it becomes possible to reduce the processing load and increase the processing speed compared to performing a computational step.

Embodiment 3

Referring again to FIGS. 9A and 9B, in Embodiment 1 illustrated in FIG. 9B, since the expanded dither threshold value Dth' is expanded, pixels with N=1 are mixed in even for the maximum value In=256 of the multi-valued input data. Thus, at the maximum value In=256 of the multi-valued input data, not all pixels become N=2. Embodiment 3 performs multi-valued quantization in which the density is improved over the maximum density.

Embodiment 3 likewise may perform a process according to the flowchart illustrated in FIG. 8A. However, whereas Embodiment 1 divides the gradation region from 0 to 255 into two parts for quantization into three values, Embodiment 3 divides the region into three parts. For this reason, whereas the quantization representative value Th=128 is prepared in Step S801 of Embodiment 1, a quantization representative value Th=86 is prepared in Step S801 of Embodiment 3.

In Step S802, similarly to Embodiment 1, Expression 1 is used to compute a provisional quantized value N' and comparative multi-valued data In'.

$$In/Th=N'rIn' \quad \text{(Expression 1)}$$

Accordingly, three varieties of provisional quantized value N' (N=0, N=1, and N=2) are obtained in Embodiment 3.

In Step S803, the quantization processing unit 306 performs an expansion process on the dither threshold value Dth. Specifically, Expression 4 is used to compute an expanded dither threshold value Dth' so that the gradation region of the threshold value (1 to 127) is expanded to a wider region (0 to 170, for example).

$$Dth'=Dth\times(170/127) \qquad \text{(Expression 4)}$$

After that, the processing from steps S804 to S807 is similar to Embodiment 1. In other words, the following is upheld:
When $In'<Dth'-\alpha$, $N=N'-1$
When $Dth'-\alpha \leq In'<Dth'$, $N=N'$
When $Dth' \leq In'$, $N=N'+1$ However, $\alpha$ in Embodiment 3 is configured so that the number of pixels corresponding to the expansion amount of the dither threshold value Dth (170−86=84) is set to the quantized value ($N=N'-1$). Thus, $\alpha=86$.

Accordingly, four varieties of quantized value ($N=0$, $N=1$, $N=2$, and $N=3$) are generated in Embodiment 3. However, since an output representation (a dot diameter or the number of dots) corresponding to $N=3$ does not exist for actual printing, for pixels having a quantized value set to $N=3$, the quantized value is forcibly changed to $N=2$.

Figure 11A:
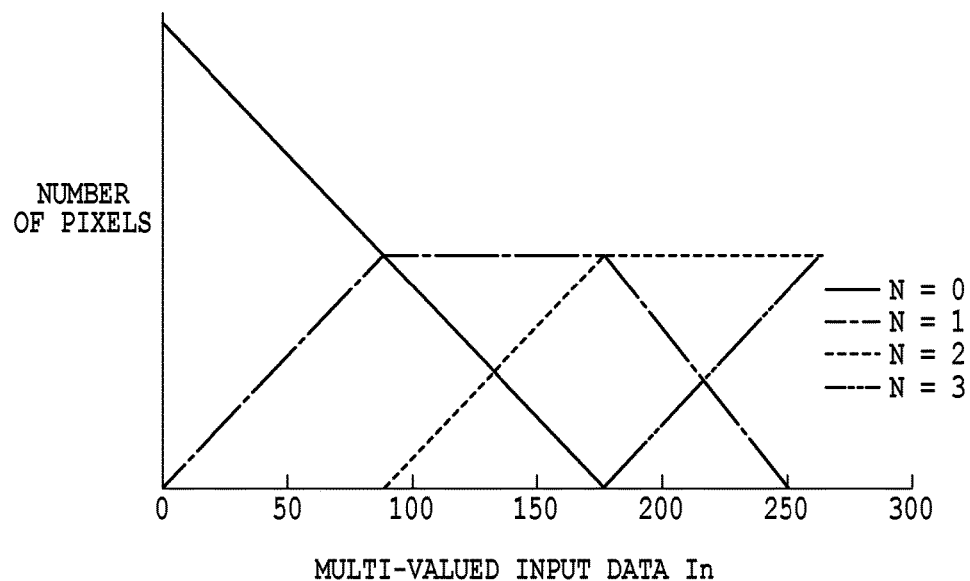
Figure 11B:
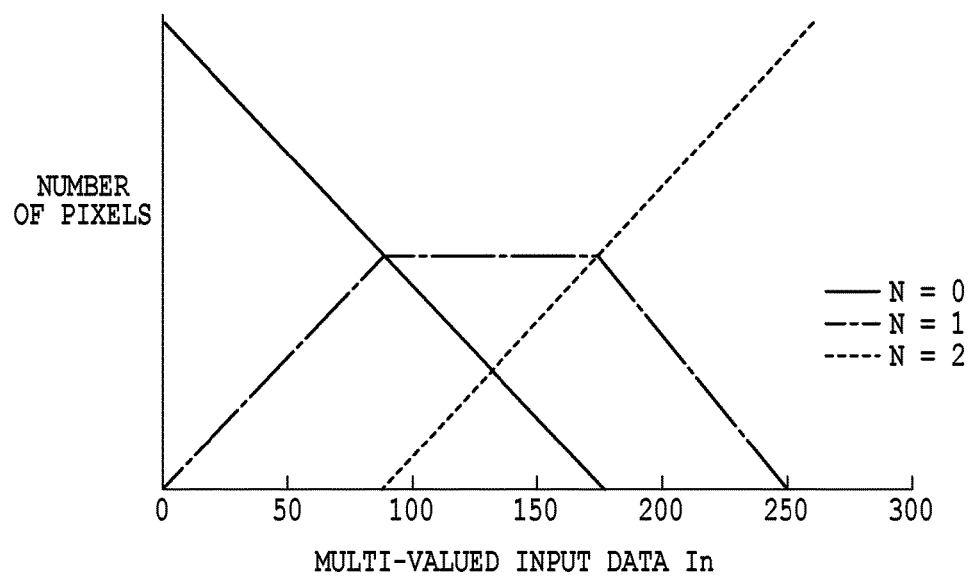

FIGS. 11A and 11B are diagrams illustrating distributions of the numbers of pixels set to the individual quantized values ($N=0$, $N=1$, $N=2$, and $N=3$) with respect to the multi-valued input data In. FIG. 11A illustrates the distribution before changing the quantized value of pixels set to $N=3$ to $N=2$, while FIG. 11B illustrates the distribution after the change. A comparison of the diagrams demonstrates that the quantized values ($N=3$) in FIG. 11A are added to the quantized values ($N=2$) in FIG. 11B. For this reason, in the final distribution after the quantization process illustrated in FIG. 11B, at the maximum value $In=255$ of the multi-valued input data, all pixels are set to the quantized value ($N=2$). In this way, according to Embodiment 3, it is possible to make the highest value $In=255$ of the multi-valued input data match up with the maximum density realizable by the printing apparatus, while also obtaining advantageous effects similar to Embodiment 1.

Meanwhile, a comparison of FIG. 11B and FIG. 9B of Embodiment 1 demonstrates that the specific gradations output with a mixture of the three levels of quantized values ($N=0$, $N=1$, and $N=2$) in FIG. 11B are much broader than in Embodiment 1. When the above is undesirable in an image, it is sufficient to adjust the width of specific gradations by changing the quantization representative value Th and the expansion ratio of the dither threshold value.

Figure 12A:
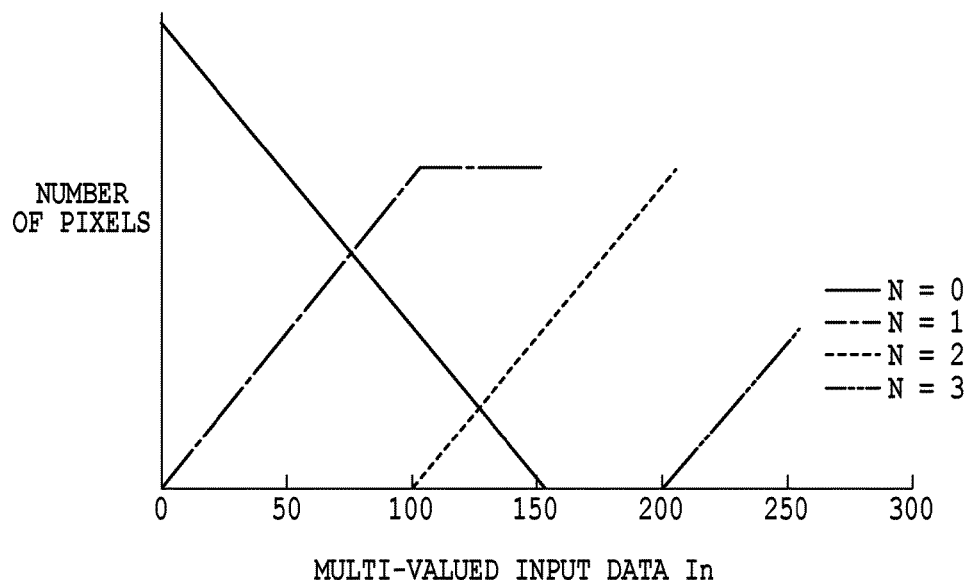
Figure 12B:
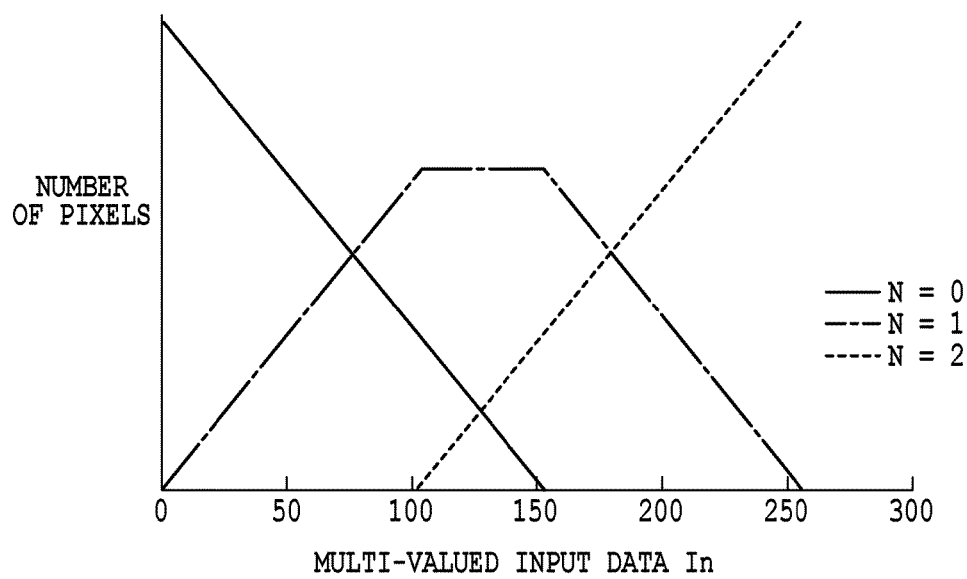

In addition, even though the actual range of the multi-valued input data is from 0 to 255, in the quantization process, an even wider region, such as from 0 to 300, for example, may be prepared. In this case, if the quantization representative value is set to $Th=100$ and a process similar to the above is performed, as illustrated in FIGS. 12A and 12B, for example, the width of specific gradations may be made narrower than FIGS. 11A and 11B while still setting the quantized values of all pixels to $N=2$ at the highest value $In=255$ of the multi-valued input data.

Note that although the foregoing Embodiments describe the case of quantizing into three values as an example, in the present invention, quantizing into four or more values is also possible. Even in the case of quantizing into four or more values, as long as three levels of quantized values may be output in a specific gradation region where a provisional quantized value switches as discussed above, the advantageous effects of the present invention, by which the graininess is reduced to a degree while also maintaining continuity, may be realized. At this point, it is not necessary to perform the above process in all gradation regions where the provisional quantized value switches. Depending on the quantized value, a discontinuity of graininess may not be visually distracting in some situations, even if the output of all pixels is uniformly set to that quantized value. In such cases, it is sufficient to provide a specific gradation region and perform the above process only for a gradation region in which a discontinuity of graininess would be visually distracting.

In addition, when adopting the present invention, since the method of adding dots is different between the specific gradation region in which three levels of quantized values are output and the other gradation regions in which two levels of quantized values are output, it is anticipated that the slope of density increase versus the multi-valued input data will be different. Even in such cases, if a one-dimensional lookup table accounting for the above situation is prepared, the gradation correction process already described in Step S203 of FIG. 2 is able to obtain a density having a linear relationship with respect to the multi-valued data inputted in Step S203. Obviously, providing another step for performing the above correction separately from Step S203 is also possible.

Furthermore, although the specific gradation region is generated by expanding the dither threshold value Dth in Embodiment 1 and expanding the comparative multi-valued data In' in Embodiment 2, a specific gradation region may also be generated by reducing one of either the dither threshold value Dth or the comparative multi-valued data In'. In either case, after matching up the gradation region of the dither threshold value Dth with the gradation region of the comparative multi-valued data In' via normalization or another process, an expansion or reduction process may be performed on one or both to make the sizes of the respective gradation regions different from each other, thereby generating the specific gradation region.

Note that in the foregoing Embodiments, all steps illustrated in FIG. 2 are described as being executed by the image processing apparatus 2. However, as long as each of the above processes is performed by an inkjet printing system according to the present embodiment illustrated in FIG. 1, each process may be processed by any device. For example, a configuration in which the image processing apparatus 2 performs the processes up to the quantization in Step S203 while the printing apparatus 1 performs the index process in Step S204 is also acceptable. In addition, the printing apparatus 1 may also be equipped with the functions of the image processing apparatus 2 described earlier, and the printing apparatus 1 may be configured to execute all steps from Step S201. In this case, the printing apparatus 1 becomes the image processing apparatus of the present invention.

In addition, the numbers of bits in the input and output data in each of the steps discussed above are not limited to the Embodiments discussed above. The number of bits in the output may also be larger than the number of bits in the input to maintain precision, and the numbers of bits may be adjusted variously according to the application or situation.

Note that the present invention is also realizable by a process of supplying a program realizing one or more functions of the foregoing Embodiments to a system or an apparatus via a network or a storage medium, and having one or more processors in a computer of the system or the apparatus read out and execute the program. In addition, the present invention is also realizable by a circuit (for example, an ASIC) that realizes one or more functions.

Furthermore, in the foregoing, an inkjet printing apparatus is utilized as a configuration that prints an image processed according to a pseudo gradation method, but the present invention is not limited to inkjet printing methods. Insofar as individual pixels are expressed at multiple densities corresponding to levels after a multi-valued quantization process, any printing method may be utilized with the present invention. For example, even an apparatus that adopts an electrophotographic method to print images falls under the scope of the present invention, as long as individual pixels may be expressed using densities corresponding to quantized levels by adjusting the output value of a laser in multiple stages.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-025477, filed Feb. 12, 2015, which is hereby incorporated by reference wherein in its entirety.

What is claimed is:

1. An image processing apparatus that converts multi-valued data into multi-valued quantized data having fewer levels than the multi-valued data, comprising:
one or more processor which executes the following steps of:
acquiring threshold values in a threshold value matrix having a designated pixel area corresponding to a plurality of pixels in an image, with different threshold values being set according to pixel position;
setting a provisional quantized value of the quantized data with respect to the multi-valued data, according to which gradation region from among a plurality of gradation regions includes a gradation indicated by the multi-valued data,
wherein each of the plurality of gradation regions corresponds to each region obtained by dividing a region of possible gradations that the multi-valued may take into two or more gradation regions;
deciding, based on a result of comparing comparative multi-valued data for the multi-valued data corresponding to the position of the gradation of the multi-valued data in the gradation region to the threshold value, whether to set the provisional quantized value, a value smaller than the provisional quantized value, or a value larger than the provisional quantized value as a quantized value of the quantized data with respect to the multi-valued data; and
outputting data used for printing by a printing unit of a printing apparatus configured to print an image onto a print medium, the data being obtained based on the quantized data,
wherein, the printing unit of the printing apparatus prints the image onto the print medium based on the output data,
wherein the one or more processor execute the step of deciding the quantized value so that in a case where the multi-valued data of each pixel in the pixel area is the same intermediate value, pixels having the value larger than provisional quantized value increase, pixels having the provisional quantized value do not change in number, and pixels having the value smaller than the provisional quantized value decrease in the designated pixel area as the value of the multi-valued data rises.

2. The image processing apparatus according to claim 1, wherein the one or more processor further executes the step of generating at least one of new comparative multi-valued data based on the comparative multi-valued data and a new threshold value based on the threshold value, so that at least one of the value of the comparative multi-valued data and the threshold value increases or decreases to differentiate the size of a gradations region in that the multi-valued data is contained from among the plurality of gradation regions and the size of a region of possible values that the threshold value may take,
wherein the one or more processor execute the step of deciding so as to decide the quantized value with respect to the multi-valued data on a basis of a result of comparing the comparative multi-valued data and the threshold value.

3. The image processing apparatus according to claim 2, wherein the one or more processor execute the step of generating so as to increase the threshold value without changing the value of the comparative multi-valued data, and
the one or more processor execute the step of deciding (i) the value larger than the provisional quantized value as the quantized value with respect to the multi-valued data in a case where the value of the comparative multi-valued data is greater than the increased threshold value, (ii) the provisional quantized value as the quantized value with respect to the multi-valued data in a case where the value of the comparative multi-valued data is less than the increased threshold value but greater than a value smaller than the increased threshold value by a designated value, and (iii) the value smaller than the provisional quantized value as the quantized value with respect to the multi-valued data in a case where the value of the comparative multi-valued data is less than the value smaller than the increased threshold value by the designated value.

4. The image processing apparatus according to claim 2, wherein
the one or more processor execute the step of generating such that at least one of the new comparative multi-valued data and the new threshold value by referencing a lookup table stored in advance.

5. The image processing apparatus according to claim 1, wherein
the plurality of gradation regions are generated by equally dividing the gradation region of the multi-valued data by a size equal to the gradation region of the threshold value.

6. The image processing apparatus according to claim 1, wherein the one or more processor further executes the step of selecting one dot arrangement pattern from among a plurality of dot arrangement patterns determining a number and position of dots to print at individual pixels, on a basis of quantized values.

7. The image processing apparatus according to claim 1, wherein the one or more processor further executes the step of
setting a size of dots to print at individual pixels, on a basis of quantized values.

8. The image processing apparatus according to claim 1, the one or more processor further executes the step of
correcting a signal value so that a density of an image obtained by printing dots onto a print medium on a basis of quantized values has a linear relationship with respect to the multi-valued data.

9. The image processing apparatus according to claim 1, wherein
the threshold value matrix has blue noise characteristics.

10. The image processing apparatus according to claim 1, further comprising the printing unit.

11. The image processing apparatus according to claim 1, wherein
the printing unit prints the image according to an inkjet method.

12. The image processing apparatus according to claim 1, wherein
the printing unit prints the image according to an electrophotographic method.

13. An image processing apparatus comprising:
a multi-valued data acquisition unit configured to acquire multi-valued data of a pixel to be processed;
one or more processor which executes the following steps of:
acquiring a threshold value, corresponding to the pixel to be processed, to be compared to the multi-valued data;
generating, from the multi-valued data and the threshold value, multi-valued quantized data having fewer levels than the multi-valued data, and
outputting data used for printing by a printing unit of a printing apparatus configured to print an image onto a print medium, the data being obtained based on the quantized data;
wherein, the printing unit of the printing apparatus prints the image onto the print medium based on the output data,
wherein the one or more processor execute the step of generating so as to the generation unit generates quantized data having three levels of values (N+1, N, N−1) with respect to the multi-valued data included in a designated gradation region,
a peak of frequency characteristics of an image in a case of mapping dots to only pixels having the quantized data equal to N is positioned lower in frequency than a peak of frequency characteristics of an image in a case of mapping dots to only pixels having the quantized data equal to N+1,
a peak of frequency characteristics of an image in a case of mapping dots to only pixels having the quantized data equal to N−1 is positioned lower in frequency than a peak of frequency characteristics of an image in a case of mapping dots to only pixels having the quantized data equal to N, and
in the designated gradation region, every time the multi-valued data increases, pixels having the quantized data equal to N+1 increase monotonically, pixels having the quantized data equal to N−1 decrease monotonically, and pixels having the quantized data equal to N do not change in number.

14. The image processing apparatus according to claim 13, wherein
the one or more processor which executes the step of acquiring the threshold value arrayed in a threshold value matrix expressing an array of threshold values corresponding to positions of pixels constituting an image, and having blue noise characteristics.

15. The image processing apparatus according to claim 13, wherein the quantized data having three levels of values (N+1, N, N−1) satisfies the relationship of (N+1>N>N−1).

16. An image processing method that converts multi-valued data into multi-valued quantized data having fewer levels than the multi-valued data, comprising:
acquiring threshold values in a threshold value matrix having a designated pixel area corresponding to a plurality of pixels in an image, with different threshold values being set according to pixel position;
setting a provisional quantized value of the quantized data with respect to the multi-valued data, according to which gradation region from among a plurality of gradation regions includes a gradation indicated by the multi-valued data,
wherein each of the plurality of gradation regions corresponds to each region obtained by dividing a region of possible gradations that the multi-valued may take into two or more gradation regions; deciding, based on a result of comparing comparative multi-valued data for the multi-valued data corresponding to the position of the gradation of the multi-valued data in the gradation region to the threshold value, whether to set the provisional quantized value, a value smaller than the provisional quantized value, or a value larger than the provisional quantized value as a quantized value of the quantized data with respect to the multi-valued data; and
outputting data used for printing by a printing unit of a printing apparatus configured to print an image onto a print medium, the data being obtained based on the quantized data,
wherein, the printing unit of the printing apparatus prints the image onto the print medium based on the output data,
wherein the step of deciding decides the quantized value so that in a case where the multi-valued data of each pixel in the pixel area is the same intermediate value, pixels having the value larger than provisional quantized value increase, pixels having the provisional quantized value do not change in number, and pixels having the value smaller than the provisional quantized value decrease in the designated pixel area as the value of the multi-valued data rises.

17. An image processing method comprising:
acquiring multi-valued data of a pixel to be processed;
acquiring a threshold value, corresponding to the pixel to be processed, to be compared to the multi-valued data;
generating, from the multi-valued data and the threshold value, multi-valued quantized data having fewer levels than the multi-valued data, and
outputting data used for printing by a printing unit of a printing apparatus configured to print an image onto a print medium, the data being obtained based on the quantized data, wherein the printing unit of the printing apparatus prints the image onto the print medium based on the output data;
wherein the generating step generates quantized data having three levels of values (N+1, N, N−1) with respect to the multi-valued data included in a designated gradation region,
a peak of frequency characteristics of an image in a case of mapping dots to only pixels having the quantized data equal to N is positioned lower in frequency than a peak of frequency characteristics of an image in a case of mapping dots to only pixels having the quantized data equal to N+1,
a peak of frequency characteristics of an image in a case of mapping dots to only pixels having the quantized data equal to N−1 is positioned lower in frequency than a peak of frequency characteristics of an image in a case of mapping dots to only pixels having the quantized data equal to N, and
in the designated gradation region, every time the multi-valued data increases, pixels having the quantized data equal to N+1 increase monotonically, pixels having the quantized data equal to N−1 decrease monotonically, and pixels having the quantized data equal to N do not change in number.

18. The image processing method according to claim 17, wherein the quantized data having three levels of values (N+1, N, N−1) satisfies the relationship of (N+1>N>N−1).

19. An image processing apparatus for processing input multi-value data corresponding to image, comprising:
one or more processor which executes the following steps of
acquiring value of the input multi-valued data and threshold value in a threshold value matrix with respect to each of pixels;
determining provisional quantized value and a value of comparative multi-valued data with respect to each of pixels, on the basis of the value of input multi-valued data and a quantization representative value;
generating a quantized data which determines quantized value to each of pixels, by determining the quantized value on the basis of the threshold value, the provisional quantized value and the value of the comparative multi-valued data; and
outputting data used for printing by a printing unit of a printing apparatus configured to print an image onto a print medium, the data being obtained based on the quantized data, wherein, the printing unit of the printing apparatus prints the image onto the print medium based on the output data,
wherein
the one or more processor executes the step of the generating such that, in a case where the value of the input multi-valued data represents intermediate value area, as the value of comparative multi-valued data is greater, (i) number of the quantized data having value smaller than the provisional quantized value decrease, (ii) number of the quantized data having value same as the provisional quantized value do not change, and (iii) number of the quantized data having value larger than the provisional quantized value increase.

20. The image processing apparatus according to claim 19, wherein
the one or more processor which executes the step of determining the provisional quantized value and the value of comparative multi-valued data such that (i) a quotient obtained by dividing the input multi-valued data by the quantization representative value becomes the provisional quantized value, and (ii) a remainder obtained by dividing the input multi-valued data by the quantization representative value becomes the comparative multi-valued data.

21. The image processing apparatus according to claim 19, wherein
the one or more processor which executes the step of generating the quantized data so as to (i) change the threshold value, (ii-1) determine the value larger than the provisional quantized value as the value of the quantized data, in a case where the value of comparative multi-valued data is larger than the changed threshold value, (ii-2) determine the value same as the provisional quantized value as the value of the quantized data, in a case where the value of comparative multi-valued data is smaller than the changed threshold value and larger than a second threshold value, the second threshold value being smaller than the changed threshold value, (ii-3) determine the value smaller than the provisional quantized value as the value of the quantized data, in a case where the value of comparative multi-valued data is smaller than the second threshold value.

22. The image processing apparatus according to claim 21, wherein the second threshold value being obtained by subtracting a first value from the changed threshold value.

23. The image processing apparatus according to claim 21, wherein the one or more processor which executes the step of generating the quantized data so as to change the threshold value by multiplying a second value to the threshold value.

24. The image processing apparatus according to claim 23, wherein the second value is larger than 1.

25. An image processing apparatus for processing input multi-value data corresponding to image, comprising:
one or more processor which executes the following steps of
acquiring value of the input multi-valued data and threshold value in a threshold value matrix with respect to each of pixels;
determining provisional quantized value and a value of comparative multi-valued data with respect to each of pixels, on the basis of the value of input multi-valued data and a quantization representative value;
changing the threshold value,
generating a quantized data which determines quantized value to each of pixels, by determining the quantized value on the basis of the changed threshold value, the provisional quantized value and the value of the comparative multi-valued data; and
outputting data used for printing by a printing unit of a printing apparatus configured to print an image onto a print medium, the data being obtained based on the quantized data, wherein, the printing unit of the printing apparatus prints the image onto the print medium based on the output data, wherein the one or more processor executes the step of generating the quantized data so as to (i) determine the value larger than the provisional quantized value as the value of the quantized data, in a case where the value of comparative multi-valued data is larger than the changed threshold value, (ii) determine the value same as the provisional quantized value as the value of the quantized data, in a case where the value of comparative multi-valued data is smaller than the changed threshold value and larger than a second threshold value, the second threshold value being smaller than the changed threshold value, (iii) determine the value smaller than the provisional quantized value as the value of the quantized data, in a case where the value of comparative multi-valued data is smaller than the second threshold value.

26. The image processing apparatus according to claim 25, wherein the one or more processor which executes the step of determining the provisional quantized value and the value of comparative multi-valued data such that (i) a quotient obtained by dividing the input multi-valued data by a quantization representative value becomes the provisional quantized value, and (ii) a remainder obtained by dividing the input multi-valued data by the quantization representative value becomes the comparative multi-valued data.

27. The image processing apparatus according to claim 26, wherein the second value is larger than 1.

28. The image processing apparatus according to claim 25, wherein the second threshold value being obtained by subtracting a first value from the changed threshold value.

29. The image processing apparatus according to claim 25, wherein the one or more processor which executes the step of generating the quantized data so as to change the threshold value by multiplying a second value to the threshold value.

30. An image processing method for processing input multi-value data corresponding to image, comprising:

acquiring value of the input multi-valued data and threshold value in a threshold value matrix with respect to each of pixels;

determining provisional quantized value and a value of comparative multi-valued data with respect to each of pixels, on the basis of the value of input multi-valued data and a quantization representative value;

generating a quantized data which determines quantized value to each of pixels, by determining the quantized value on the basis of the threshold value, the provisional quantized value and the value of the comparative multi-valued data; and outputting data used for printing by a printing unit of a printing apparatus configured to print an image onto a print medium, the data being obtained based on the quantized data, wherein the printing unit of the printing apparatus prints the image onto the print medium based on the output data, wherein the step of the generating executes such that, in a case where the value of the input multi-valued data represents intermediate value area, as the value of comparative multi-valued data is greater, (i) number of the quantized data having value smaller than the provisional quantized value decrease, (ii) number of the quantized data having value same as the provisional quantized value do not change, and (iii) number of the quantized data having value larger than the provisional quantized value increase.

31. An image processing method for processing input multi-value data corresponding to image, comprising:

acquiring value of the input multi-valued data and threshold value in a threshold value matrix with respect to each of pixels;

determining provisional quantized value and a value of comparative multi-valued data with respect to each of pixels, on the basis of the value of input multi-valued data and a quantization representative value;

changing the threshold value, generating a quantized data which determines quantized value to each of pixels, by determining the quantized value on the basis of the changed threshold value, the provisional quantized value and the value of the comparative multi-valued data; and outputting data used for printing by a printing unit of a printing apparatus configured to print an image onto a print medium, the data being obtained based on the quantized data, wherein, the printing unit of the printing apparatus prints the image onto the print medium based on the output data, wherein the step of generating generates the quantized data so as to (i) determine the value larger than the provisional quantized value as the value of the quantized data, in a case where the value of the input multi-valued data is larger than the changed threshold value, (ii) determine the value same as the provisional quantized value as the value of the quantized data, in a case where the value of comparative multi-valued data is smaller than the changed threshold value and larger than a second threshold value, the second threshold value being smaller than the changed threshold value, (iii) determine the value smaller than the provisional quantized value as the value of the quantized data, in a case where the value of comparative multi-valued data is smaller than the second threshold value.

* * * * *